(12) United States Patent
Sano et al.

(10) Patent No.: US 6,965,479 B2
(45) Date of Patent: Nov. 15, 2005

(54) OPTICAL FILTER, INTERLEAVER, AND OPTICAL COMMUNICATION SYSTEM

(75) Inventors: Tomomi Sano, Yokohama (JP); Hiroshi Suganuma, Yokohama (JP); Tamoya Kenmochi, Hashimoto (JP); Tetsuya Iimura, Yokohama (JP); Manabu Shiozaki, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/468,895

(22) PCT Filed: Dec. 10, 2002

(86) PCT No.: PCT/JP02/12886

§ 371 (c)(1),
(2), (4) Date: Aug. 26, 2003

(87) PCT Pub. No.: WO03/056725

PCT Pub. Date: Jul. 10, 2003

(65) Prior Publication Data

US 2004/0075902 A1    Apr. 22, 2004

(30) Foreign Application Priority Data

Dec. 27, 2001  (JP) .............................. 2001-398019
May 31, 2002  (JP) .............................. 2002-160070

(51) Int. Cl.[7] .................. G02G 27/14; G02G 27/10; G02F 1/01; G02F 1/23
(52) U.S. Cl. .................. 359/634; 359/637; 359/618; 359/629; 359/276; 359/278; 359/279
(58) Field of Search .................. 359/237, 238, 359/276, 278, 279, 495–498, 618, 629, 634, 359/637, 727; 356/479; 385/27

(56) References Cited

U.S. PATENT DOCUMENTS 5,301,010 A * 4/1994 Jones et al. .................. 356/479
6,097,861 A * 8/2000 Kim et al. .................... 385/27
6,108,140 A * 8/2000 Hashimoto et al. ......... 359/727

FOREIGN PATENT DOCUMENTS

JP   2001-194543   7/2001
JP   2001-333015   11/2001

* cited by examiner

OTHER PUBLICATIONS

Benjamin B. Dingel, "Multi-Function Optical Filter using Michelson-GYT Interferometer", The Institute of Electronics, Information and Communication Engineers, Technical Report of IEICE, OSC97-50, ED97-140, OPE97-95, LQE97-95 (Nov. 1997), pp. 67-72.

*Primary Examiner*—Loha Ben
*Assistant Examiner*—Jack Dinh
(74) *Attorney, Agent, or Firm*—McDermott Will & Emery LLP

(57) ABSTRACT

A first optical system (11) has a first beam splitter (211). The first beam splitter (211) splits light arriving through a first optical path (P1) into two light beams, and outputs one light beam to a second optical path (P2) and the other light beam to a third optical path (P3). A second optical system (21) outputs the light output from the first beam splitter (221) to the second optical path (P2) and arriving at the second optical system (21) upon giving the light an intensity change with wavelength dependence and a phase change, and has a second beam splitter (221), first reflecting mirror (223), and second reflecting mirror (222). This makes it possible to provide an optical filter (200) which can realize a characteristic excellent in isolation with a very simple arrangement.

17 Claims, 8 Drawing Sheets

OPTICAL FILTER, INTERLEAVER, AND OPTICAL COMMUNICATION SYSTEM

TECHNICAL FIELD

The present invention relates to an optical filter, an interleaver including an optical filter, and an optical communication system having an optical filter or interleaver.

BACKGROUND ART

An interleaver used in an optical communication system is designed to receive signal light of multiple wavelengths ($\lambda_1, \lambda_2, \ldots, \lambda_{2n-1}, \lambda_{2n}, \ldots$) and demultiplex the light into signal light in a first wavelength range $\Lambda_1$ ($\lambda_1, \lambda_3, \ldots, \lambda_{2n-1}, \ldots$) and signal light in a second wavelength range $\Lambda_2$ ($\lambda_2, \lambda_4, \ldots, \lambda_{2n}, \ldots$), and is provided for a repeater or the like in the optical communication system. Such interleavers based on various schemes have been proposed. For example, known interleavers include one that includes a polarizing/separating element, wavelength filter, and polarizing/combining element and one that includes an optical system forming a Mach-Zehnder interferometer. An interleaver having an optical filter including an optical system forming a Michelson interferometer is also conceivable.

DISCLOSURE OF INVENTION

In the transmission characteristic of an optical filter including an optical system forming a Michelson interferometer, a transmission peak periodically appears, and each transmission peak characteristic becomes a Gaussian type. The isolation of the optical filter including the optical system forming the Michelson interferometer is inevitably determined. When this optical filter is applied to wavelength division multiplexing optical communication, the isolation between adjacent wavelengths is 9.8 dB, which is lower than that of an optical filter used for general optical communication, i.e., 20 dB. As a consequence, the isolation of the interleaver having the optical filter including the optical system forming the Michelson interferometer also becomes low, and hence the transmission quality of signal light in the wavelength division multiplexing optical communication system having this interleaver is poor.

The present invention has been made to solve the above problems, and has as its object to provide an optical filter with excellent isolation, an interleaver including the optical filter, and an optical communication system including the optical filter or interleaver.

An optical filter according to the present invention is characterized by comprising a first optical system which has a first beam splitter, splits light arriving at the first beam splitter through a first optical path into two light beams, and outputs the split light beams to different second and third optical paths, respectively, and a second optical system which outputs light arriving after being output from the first beam splitter to the second optical path upon giving the light an intensity change with wavelength dependence and a phase change.

In the above optical filter, preferably, the optical filter comprises a reflecting mirror which outputs, to the first beam splitter, light arriving after being output from the first beam splitter to the third optical path, the second optical system outputs light given an intensity change with wavelength dependence and a phase change to the first beam splitter, and the first beam splitter splits light arriving after being output from the second optical system into two light beams, outputs the light beams to the first optical path and a fourth optical path, respectively, also splits light arriving after being output from the reflecting mirror into two light beams, and outputs the light beams to the first and fourth optical paths, respectively.

Preferably, the second optical system comprises a second beam splitter different from the first beam splitter and first and second reflecting mirrors, splits light arriving through the second optical path into two light beams using the second beam splitter, outputs the light beams to the first and second reflecting mirrors, respectively, splits the light reflected by the first reflecting mirror and arriving at the second beam splitter into two light beams, outputs one light beam to the first beam splitter, splits the light reflected by the second reflecting mirror and arriving at the second beam splitter into two light beams, and outputs one light beam to the first beam splitter.

Preferably, letting d2 be a length of the second optical path between the first beam splitter and the second beam splitter, d3 be a length of the optical path between the first beam splitter and the reflecting mirror, d5 be a length of the fifth optical path between the second beam splitter and the first reflecting mirror, and d6 be a length of the sixth optical path between the second beam splitter and the second reflecting mirror, a free spectral range determined on the basis of a difference between the optical path lengths d5 and d6 is set to ½ a free spectral range determined on the basis of a difference between the optical path lengths d2 and d3.

The split ratio of each of the first and second beam splitters is preferably 48% to 52%.

The above optical filter preferably comprises a third optical system which outputs light arriving after being output from the first beam splitter to the third optical path, upon giving the light an intensity change with wavelength dependence and a phase change.

Preferably, the second optical system outputs light given an intensity change with wavelength dependence and a phase change to the first beam splitter, the third optical system outputs light given an intensity change with wavelength dependence and a phase change to the first beam splitter, and the first beam splitter splits the light arriving after being output from the second optical system into two light beams, outputs the light beams to the first optical path and a fourth optical path, respectively, splits the light arriving after being output from the third optical system into two light beams, and outputs the light beams to the first and fourth optical paths, respectively.

Preferably, the second optical system comprises a second beam splitter different from the first beam splitter and first and second reflecting mirrors, splits light arriving at the second beam splitter through the second optical path into two light beams, outputs the light beams to the first and second reflecting mirrors, respectively, splits the light reflected by the first reflecting mirror and arriving at the second beam splitter into two light beams, outputs one light beam to the first beam splitter, splits the light reflected by the second reflecting mirror and arriving at the second beam splitter into two light beams, and outputs one light beam to the first beam splitter, and the third optical system comprises a third beam splitter different from the first beam splitter and third and fourth reflecting mirrors, splits light arriving at the third beam splitter through the third optical path into two light beams, outputs the light beams to the third and fourth reflecting mirrors, respectively, splits the light reflected by the third reflecting mirror and arriving at the third beam splitter into two light beams, outputs one light beam to the first beam splitter, splits the light reflected by the fourth reflecting mirror and arriving at the third beam splitter into two light beams, and outputs one light beam to the first beam splitter.

Preferably, letting d2 be a length of the second optical path between the first beam splitter and the second beam splitter, d3 be a length of the optical path between the first beam splitter and the third beam splitter, d5 be a length of the fifth optical path between the second beam splitter and the first reflecting mirror, d6 be a length of the sixth optical path between the second beam splitter and the second reflecting mirror, d7 be a length of the seventh optical path between the third beam splitter and the third reflecting mirror, and d8 be a length of the eighth optical path between the third beam splitter and the fourth reflecting mirror, a free spectral range determined on the basis of a difference between the optical path lengths d5 and d6 and a free spectral range determined on the basis of a difference between the optical path lengths d7 and d8 each are set to ½ a free spectral range determined on the basis of a difference between the optical path lengths d2 and d3.

Preferably, the second optical system comprises a second beam splitter different from the first beam splitter, a first reflecting mirror, and a first etalon filter, splits light arriving at the second beam splitter through the second optical path into two light beams, outputs the light beams to the first reflecting mirror and the first etalon filter, respectively, splits the light reflected by the first reflecting mirror and arriving at the second beam splitter into two light beams, outputs one light beam to the first beam splitter, splits the light reflected by the first etalon filter and arriving at the second beam splitter into two light beams, and outputs one light beam to the first beam splitter, and the third optical system comprises a third beam splitter different from the first beam splitter, a second reflecting mirror, and a second etalon filter, splits light arriving at the third beam splitter through the third optical path into two light beams, outputs the light beams to the second reflecting mirror and the second etalon filter, respectively, splits the light reflected by the second reflecting mirror and arriving at the third beam splitter into two light beams, outputs one light beam to the first beam splitter, splits the light reflected by the second etalon filter and arriving at the third beam splitter into two light beams, and outputs one light beam to the first beam splitter.

Preferably, letting d2 be a length of the second optical path between the first beam splitter and the second beam splitter, and d3 be a length of the third optical path between the first beam splitter and the third beam splitter, a free spectral range of each of the first and second etalon filters is set to ½ a free spectral range determined on the basis of a difference between the optical path lengths d2 and d3.

Preferably, the split ratio of the first beam splitter is 48% to 52%, and a split ratio of each of the second and third beam splitters is 24.9% to 28.9%.

Preferably, the first optical system further comprises a first reflecting mirror and a first etalon filter, splits light arriving at the first beam splitter through the first optical path into two light beams, outputs the light beams to the first reflecting mirror and the first etalon filter, respectively, splits light reflected by the first reflecting mirror and arriving at the first beam splitter into two light beams, outputs the light beams to the second and third optical paths, splits light reflected by the first etalon filter and arriving at the first beam splitter into two light beams, and outputs the light beams to the second and third optical paths, respectively, the second optical system comprises a second optical beam splitter different from the first beam splitter, a second reflecting mirror, and a second etalon filter, splits light arriving at the second optical beam splitter through the second optical path into two light beams, outputs the light beams to the second reflecting mirror and the second etalon filter, splits light reflected by the second reflecting mirror and arriving at the second optical beam splitter into two light beams, outputs one light beam to a second port, splits light reflected by the second etalon filter and arriving at the second optical beam splitter into two light beams, and outputs one light beam to the second port, and the third optical system comprises a third optical beam splitter different from the first beam splitter, a third reflecting mirror, and a third etalon filter, splits light arriving at the third optical beam splitter through the third optical path into two light beams, outputs the light beams to the third reflecting mirror and the third etalon filter, respectively, splits light reflected by the third reflecting mirror and arriving at the third optical beam splitter into two light beams, outputs one light beam to a third port, splits light reflected by the third etalon filter and arriving at the third optical beam splitter into two light beams, and outputs one light beam to the third port.

Preferably, letting d2 be an optical path length between the first beam splitter and the first reflecting mirror, and d3 be an optical path length between the first beam splitter and the first etalon filter, a free spectral range of each of the second and third etalon filters is set to ½ a free spectral range determined on the basis of a difference between the optical path length d2 and the optical path length d3.

The isolation of the above optical filter is preferably not less than 15 dB.

The wavelength dispersion of the above optical filter is preferably −5 ps/nm to 5 ps/nm.

An interleaver according to the present invention is characterized by comprising an optical circulator which has a first terminal, a second terminal, and a third terminal, outputs, from the second terminal, light input to the first terminal, and outputs, from the third terminal, light input to the second terminal, and any one of the above optical filters in which the first optical path is connected to the second terminal of the optical circulator.

An optical communication system according to the present invention is an optical communication system which transmits signal light of multiple wavelengths, characterized by including the above optical filter, the optical filter selecting and transmitting signal light of the signal light of the multiple wavelengths.

Another optical communication system according to the present invention is an optical communication system which transmits signal light of multiple wavelengths, characterized by including the above interleaver, the interleaver demultiplexing the signal light of the multiple wavelengths.

BEST MODE FOR CARRYING OUT THE INVENTION

Figure 1:
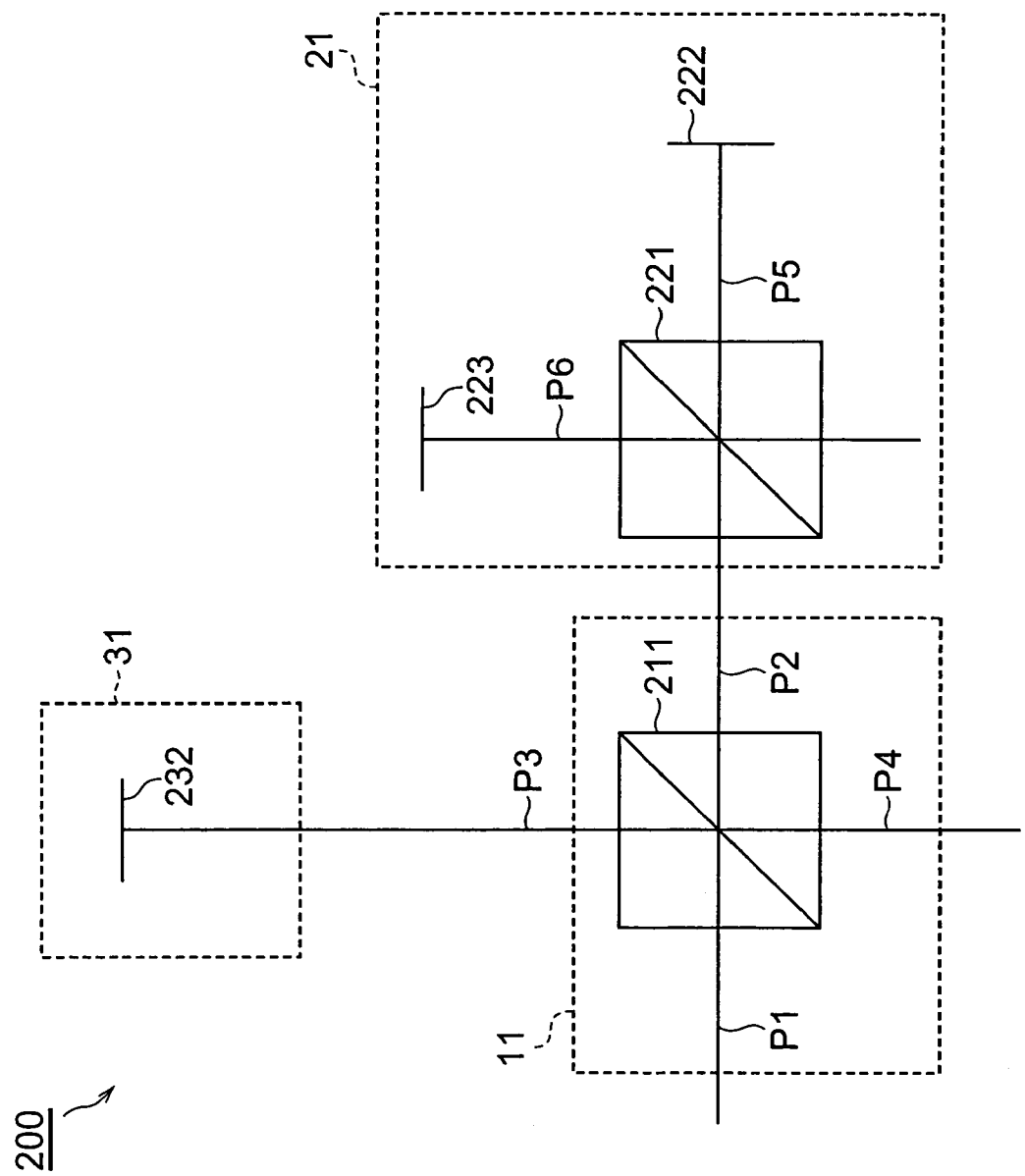
FIG. 1 is a view showing the arrangement of an optical filter 200 according to the first embodiment.

Optical filters, interleavers, optical communication systems according to the embodiments of the present invention will be described with reference to the accompanying drawings. In the following description, the same reference numerals denote the same elements or functions, and a repetitive description will be avoided.

(First Embodiment)

An optical filter according to the first embodiment of the present invention will be described first. FIG. 1 is view showing the arrangement of an optical filter 200 of the first embodiment. The optical filter 200 has a first optical system 11, second optical system 21, and third optical system 31.

The first optical system 11 includes a first beam splitter 211. The second optical system 21 includes a second beam splitter 221, first reflecting mirror (total reflection mirror) 222, and second reflecting mirror (total reflection mirror) 223. The third optical system 31 includes a third reflecting mirror (total reflection mirror) 232.

The first beam splitter 211 splits light arriving through a first optical path P1 into two light beams and outputs one light beam to a second optical path P2 and the other light beam to a third optical path P3. The first beam splitter 211 splits the light arriving through the second optical path P2 into two light beams and outputs one light beam to the first optical path P1 and the other light beam to a fourth optical path P4. The first beam splitter 211 also splits the light arriving from the third optical path P3 into two light beams and outputs one light beam to the first optical path P1 and the other light beam to the fourth optical path P4.

The second optical system 21 including the second beam splitter 221, first reflecting mirror 222, and second reflecting mirror 223 forms a Michelson interferometer. That is, the second beam splitter 221 splits light arriving through the second optical path P2 into two light beams and outputs one light beam to a fifth optical path P5 and the other light beam to a sixth optical path P6. The second beam splitter 221 splits the light arriving through the fifth optical path P5 into two light beams and outputs one light beam to the second optical path P2. The second beam splitter 221 also splits the light arriving through the sixth optical path P6 into two light beams and outputs one light beam to the second optical path P2. The second optical system 21 outputs light, output from the first beam splitter 211 to the second optical path P2 and arriving at the second optical system 21, after giving the light an intensity change with wavelength dependence and a phase change.

The first reflecting mirror 222 reflects the light arriving through the fifth optical path P5 and outputs the light to the fifth optical path P5. The second reflecting mirror 223 reflects the light arriving through the sixth optical path P6 and outputs the light to the sixth optical path P6.

The third reflecting mirror 232 of the third optical system 31 reflects the light arriving through the third optical path P3 and outputs the light to the third optical path P3.

Letting d2 be the length of the second optical path P2 between the first beam splitter 211 and the second beam splitter 221, d3 be the length of the third optical path P3 between the first beam splitter 211 and the third reflecting mirror 232, d5 be the length of the fifth optical path P5 between the second beam splitter 221 and the first reflecting mirror 222, and d6 be the length of the sixth optical path P6 between the second beam splitter 221 and the second reflecting mirror 223, the free spectral range (FSR) determined on the basis of the difference between the optical path lengths d5 and d6 is set to ½ the free spectral range determined on the basis of the difference between the optical path lengths d2 and d3.

The optical filter 200 operates as follows. Light incident along the first optical path P1 is split into two light beams by the first beam splitter 211, and one light beam is output to the second optical path P2 while the other light beam is output to the third optical path P3.

One light beam output to the second optical path P2 is split into two light beams by the second beam splitter 221, and one light beam is output to the fifth optical path P5 while the other light beam is output to the sixth optical path P6. The light output to the fifth optical path P5 is reflected by the first reflecting mirror 222, and output to the fifth optical path P5 to arrive at the second beam splitter 221. This light is split into two light beams by the second beam splitter 221, and one light beam is output to the second optical path P2. The light output to the sixth optical path P6 is reflected by the second reflecting mirror 223 and output to the sixth optical path P6 to arrive at the second beam splitter 221. This light is split into two light beams by the second beam splitter 221, and one light beam is output to the second optical path P2. The light output from the second beam splitter 221 to the second optical path P2 is the light obtained when the light beams arriving at the second beam splitter 221 through the fifth optical path P5 and sixth optical path P6 are partly superimposed on each other.

The light split by the second beam splitter 221 and output to the second optical path P2 is split into two light beams by the first beam splitter 211, and one light beam is output to the first optical path P1 while the other light beam is output to the fourth optical path P4.

The other light beam of the light split by the first beam splitter 211 and output to the third optical path P3 is reflected by the third reflecting mirror 232 and output to the third optical path P3 to arrive at the first beam splitter 211. This light is then split into two light beams by the first beam splitter 211, and one light beam is output to the first optical path P1 while the other light beam is output to the fourth optical path P4.

The light output from the first beam splitter 211 to the first optical path P1 is the light obtained when the light beams arriving at the first beam splitter 211 through the second optical path P2 and third optical path P3 are partly superimposed on each other. The light output from the first beam splitter 211 to the fourth optical path P4 is also the light obtained when the light beams arriving at the first beam splitter 211 through the second optical path P2 and third optical path P3 are partly superimposed on each other.

In the optical filter 200, the Michelson interferometer constituted by the first optical system 11 having the first beam splitter 211, the second optical system 21, and the third optical system 31 having the third reflecting mirror 232 has a transmission characteristic with a period corresponding to the optical path length difference between the two optical paths. The optical filter 200 can therefore receive signal light of multiple wavelengths ($\lambda_1, \lambda_2, \ldots, \lambda_{2n-1}, \lambda_{2n}, \ldots$)

through the first optical path, demultiplex it, and output signal light in a first wavelength range $\Lambda_1$ ($\lambda_1, \lambda_3, \ldots, \lambda_{2n-1}, \ldots$) to the first optical path and signal light in a second wavelength range $\Lambda_2$ ($\lambda_2, \lambda_4, \ldots \lambda_{2n}, \ldots$) to the fourth optical path. In this case, $\lambda_1 < \lambda_2 < \ldots < \lambda_{2n-1} < \lambda_{2n} < \ldots$.

In addition, the transmittances of the optical filter 200 in the first wavelength range $\Lambda_1$ ($\lambda_1, \lambda_3, \ldots, \lambda_{2n-1}, \ldots$) and the second wavelength range $\Lambda_2$ ($\lambda_2, \lambda_4, \ldots, \lambda_{2n}, \ldots$) exhibit a characteristic excellent in isolation in accordance with the loss characteristic of the second optical system 21 as a component of the Michelson interferometer. This characteristic can be realized with a very simple arrangement.

Furthermore, in the optical filter 200, the free spectral range of the second optical system 21 which is determined on the basis of the difference between the optical path lengths d5 and d6 is set to ½ the free spectral range determined on the basis of the difference between the optical path lengths d2 and d3. When, therefore, signal light of multiple wavelengths ($\lambda_1, \lambda_2, \ldots, \lambda_{2n-1}, \lambda_{2n}, \ldots$) is incident on the optical filter 200 of the first embodiment along the first optical path P1, and the free spectral range determined on the basis of the difference between the optical path lengths d5 and d6 corresponds to the wavelength interval of the signal light of multiple wavelengths, one of the signal light in the first wavelength range $\Lambda_1$ ($\lambda_1, \lambda_3, \ldots \lambda_{2n-1}, \ldots$) and the signal light in the second wavelength range $\Lambda_2$ ($\lambda_2, \lambda_4, \ldots \lambda_{2n}, \ldots$) is output from the first optical path P1, and the other light is output from the fourth optical path P4, thus a excellent isolation characteristic is properly realized.

The first beam splitter 211 and second beam splitter 221 each preferably have a split ratio of 48% to 52%. In this case, the isolation of the optical filter 200 can be improved to about 20 dB.

The optical filter 200 according to the first embodiment preferably has an isolation of 15 dB or more. In this case, the optical filter 200 can be applied to a wavelength division multiplexing optical communication system.

The optical filter 200 according to the first embodiment preferably has a wavelength dispersion of −5 ps/nm or more and 5 ps/nm or less. In this case, the optical filter 200 can be applied to a wavelength division multiplexing optical communication system, and more specifically, a high-speed wavelength division multiplexing optical communication system with a transmission speed of 40 Gbps.

Figure 2:
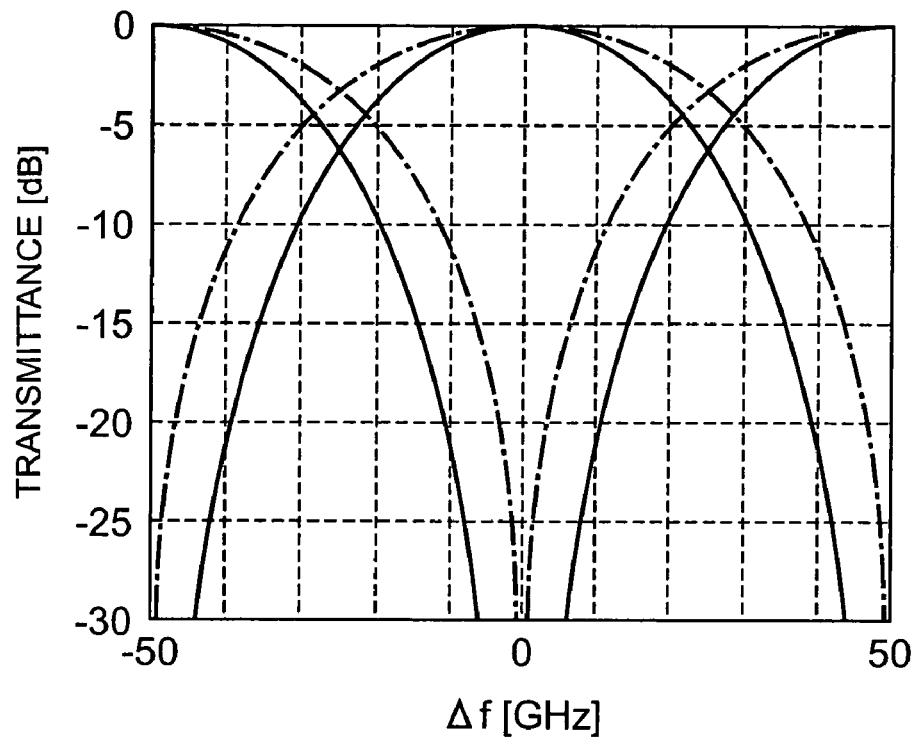
FIG. 2 is a graph showing the transmission characteristic of the optical filter 200 according to the first embodiment.

FIG. 2 is a graph showing the transmission characteristic of the optical filter 200 according to this embodiment. The split ratio of each of the first beam splitter 211 and second beam splitter 221 was set to 50%. The free spectral range of the second optical system 21 which was determined on the basis of the difference between the optical path lengths d5 and d6 was set to 50 GHz, and the difference between the optical path lengths d2 and d3 of the second and third optical paths P2 and P3 was set to 1.498570 mm. The free spectral range determined on the basis of the difference between the optical path lengths d2 and d3 was then set to 100 GHz. Referring to FIG. 2, the abscissa represents a deviation $\Delta f$ from the center frequency at a wavelength of 1550.52 nm (frequency: 193.350 THz). In this graph, the chain line represents the transmission characteristic of a conventional optical filter. Obviously, the optical filter 200 according to this embodiment is superior in isolation to the conventional optical filter. The isolation of the optical filter 200 was improved to about 20 dB. Note that there is a difference of 50 GHz between the transmission peak frequency of the transmission characteristic of signal light arriving at the fourth optical path P4 through first optical path P1 and the transmission peak frequency of the transmission characteristic of signal light input through the first optical path P1 and returning to the first optical path P1.

Figure 3:
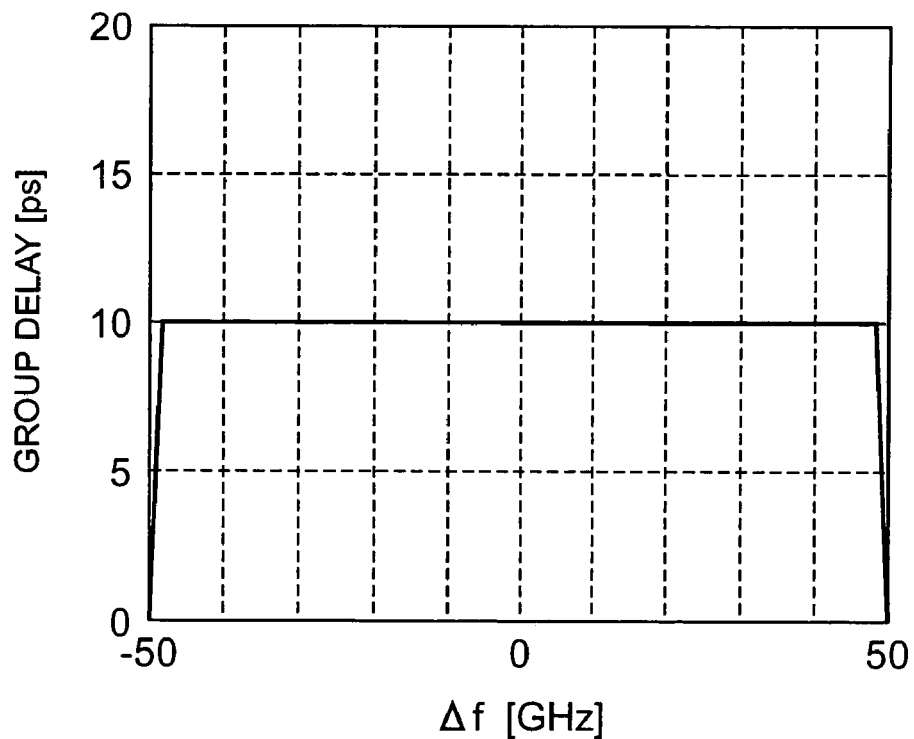
FIG. 3 is a graph showing the group delay characteristic of the optical filter 200 according to the first embodiment.

FIG. 3 is a graph showing the group delay characteristic of the optical filter 200 according to this embodiment. The split ratio of each of the first beam splitter 211 and second beam splitter 221 was set to 50%. Referring to FIG. 3, the abscissa represents a deviation $\Delta f$ from the center frequency at a wavelength of 1550.52 nm (frequency: 193.350 THz). As shown in FIG. 3, no wavelength dispersion (i.e., the gradient of the group delay characteristic) occurs.

(Second Embodiment)

Figure 4:
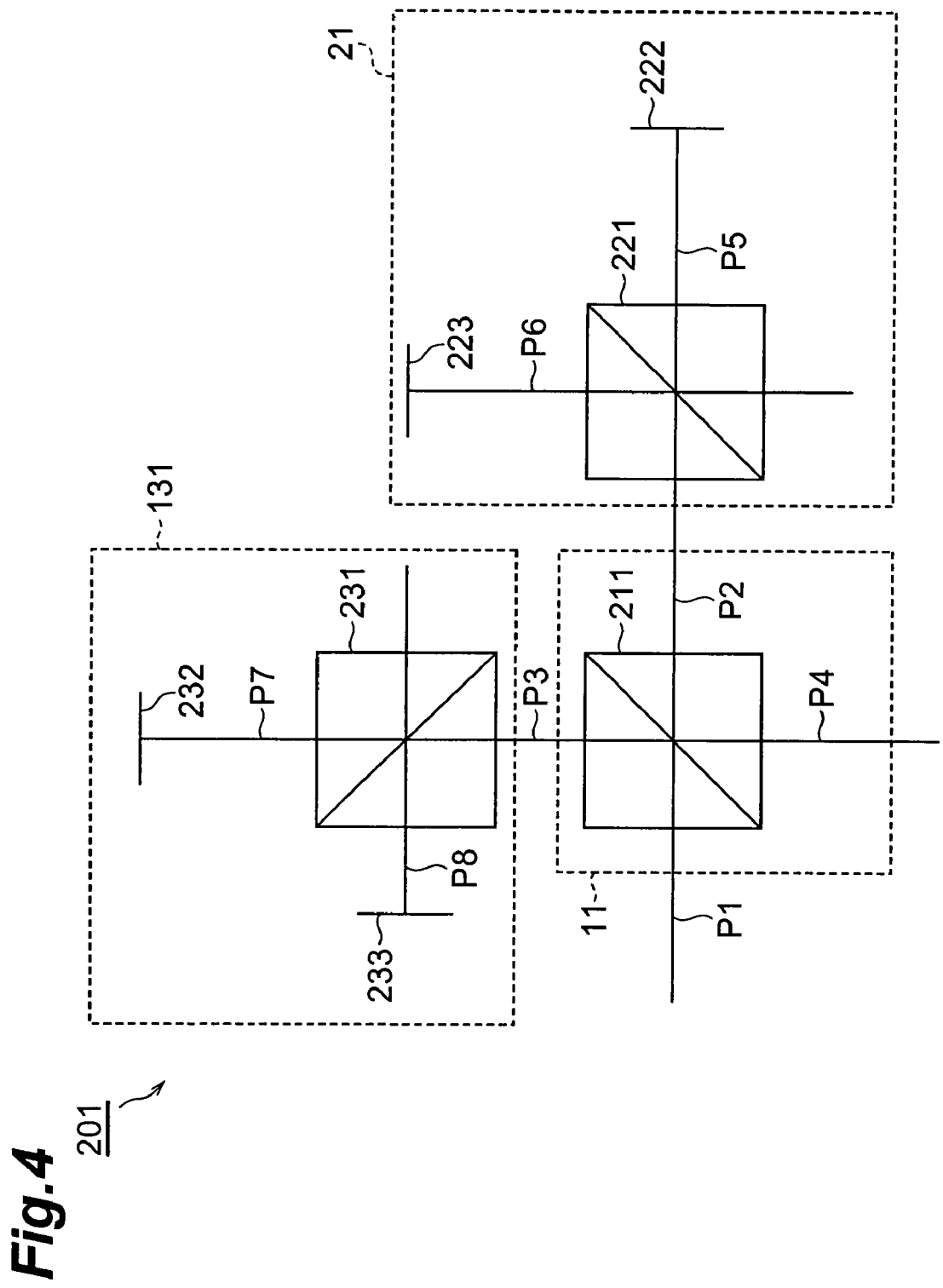
FIG. 4 is a view showing the arrangement of an optical filter 201 according to the second embodiment.

An optical filter according to the second embodiment of the present invention will be described next. FIG. 4 is view showing the arrangement of an optical filter 201 according to the second embodiment. The optical filter 201 has a first optical system 11, second optical system 21, and third optical system 131.

The first optical system 11 includes a first beam splitter 211. The second optical system 21 includes a second beam splitter 221, first reflecting mirror 222, and second reflecting mirror 223. The third optical system 131 includes a third beam splitter 231, third reflecting mirror 232, and fourth reflecting mirror 233.

The first beam splitter 211 splits light arriving through a first optical path P1 into two light beams and outputs one light beam to a second optical path P2 and the other light beam to a third optical path P3. The first beam splitter 211 splits the light arriving through the second optical path P2 into two light beams and outputs one light beam to the first optical path P1 and the other light beam to a fourth optical path P4. The first beam splitter 211 also splits the light arriving from the third optical path P3 into two light beams and outputs one light beam to the first optical path P1 and the other light beam to the fourth optical path P4.

The second optical system 21 including the second beam splitter 221, first reflecting mirror 222, and second reflecting mirror 223 forms a Michelson interferometer. The second optical system 21 outputs light, output from the first beam splitter 211 to the second optical path P2 and arriving at the second optical system 21, after giving the light an intensity change with wavelength dependence and a phase change. That is, the second beam splitter 221 splits the light arriving through the second optical path P2 into two light beams and outputs one light beam to a fifth optical path P5 and the other light beam to a sixth optical path P6. The second beam splitter 221 splits the light arriving through the fifth optical path P5 into two light beams and outputs one light beam to the second optical path P2. The second beam splitter 221 also splits the light arriving through the sixth optical path P6 into two light beams and outputs one light beam to the second optical path P2.

The first reflecting mirror 222 reflects the light arriving through the fifth optical path P5 and outputs the light to the fifth optical path P5. The second reflecting mirror 223 reflects the light arriving through the sixth optical path P6 and outputs the light to the sixth optical path P6.

The third optical system 131 including the third beam splitter 231, third reflecting mirror 232, and fourth reflecting mirror 233 forms a Michelson interferometer. The third optical system 131 outputs light, output from the first beam splitter 211 to the third optical path P3 and arriving at the third optical system 131, after giving the light an intensity change with wavelength dependence and a phase change. That is, the third beam splitter 231 splits light arriving through the third optical path P3 into two light beams and outputs one light beam to a seventh optical path P7 and the other light beam to an eighth optical path P8. The third beam splitter 231 splits the light arriving through the seventh optical path P7 into two light beams and outputs one light beam to the third optical path P3. The third beam splitter 231 also splits the light arriving through the eighth optical path P8 into two light beams and outputs one light beam to the third optical path P3.

The third reflecting mirror 232 reflects the light arriving through the seventh optical path P7 and outputs the light to the seventh optical path P7. The fourth reflecting mirror 233 reflects the light arriving through the eighth optical path P8 and outputs the light to the eighth optical path P8.

Letting d2 be the length of the second optical path P2 between the first beam splitter 211 and the second beam splitter 221, d3 be the length of the third optical path P3 between the first beam splitter 211 and the third beam splitter 231, d5 be the length of the fifth optical path P5 between the second beam splitter 221 and the first reflecting mirror 222, d6 be the length of the sixth optical path P6 between the second beam splitter 221 and the second reflecting mirror 223, d7 be the length of the seventh optical path P7 between the third beam splitter 231 and the third reflecting mirror 232, and d8 be the length of the eighth optical path P8 between the third beam splitter 231 and the fourth reflecting mirror 233, the free spectral range determined on the basis of the difference between the optical path lengths d5 and d6 and the free spectral range determined on the basis of the difference between the optical path lengths d7 and d8 each are set to ½ the free spectral range determined on the basis of the difference between the optical path lengths d2 and d3.

The first beam splitter 211 has a split ratio of 48% to 52%. The second beam splitter 221 and third beam splitter 231 each have a split ratio of 24.9% to 28.9%.

The optical filter 201 operates as follows. Light incident along the first optical path P1 is split into two light beams by the first beam splitter 211, and one light beam is output to the second optical path P2 while the other light beam is output to the third optical path P3.

One light beam output to the second optical path P2 is split into two light beams by the second beam splitter 221, and one light beam is output to the fifth optical path P5 while the other light beam is output to the sixth optical path P6. The light output to the fifth optical path P5 is reflected by the first reflecting mirror 222 and output to the fifth optical path P5 to arrive at the second beam splitter 221. This light is then split into two light beams by the second beam splitter 221, and one light beam is output to the second optical path P2. The light output to the sixth optical path P6 is reflected by the second reflecting mirror 223 and output to the sixth optical path P6 to arrive at the second beam splitter 221. This light is then split into two light beams by the second beam splitter 221, and one light beam is output to the second optical path P2. The light output from the second beam splitter 221 to the second optical path P2 is the light obtained when the light beams arriving at the second beam splitter 221 through the fifth optical path P5 and sixth optical path P6 are partly superimposed on each other.

The light split by the second beam splitter 221 and output to the second optical path P2 is split into two light beams by the first beam splitter 211, and one light beam is output to the first optical path P1 while the other light beam is output to the fourth optical path P4.

The other light beam of the light split by the first beam splitter 211 and output to the third optical path P3 is split into two light beams by the third beam splitter 231, and one light beam is output to the seventh optical path P7 while the other light beam is output to the eighth optical path P8. The light output to the seventh optical path P7 is reflected by the third reflecting mirror 232 and output to the seventh optical path P7 to arrive at the third beam splitter 231. This light is then split into two light beams by the third beam splitter 231, and one light beam is output to the third optical path P3. The light output to the eighth optical path P8 is reflected by the fourth reflecting mirror 233 and output to the eighth optical path P8 to arrive at the third beam splitter 231. This light is then split into two light beams by the third beam splitter 231, and one light beam is output to the third optical path P3. The light output from the third beam splitter 231 to the third optical path P3 is the light obtained when the light beams arriving at the third beam splitter 231 through the seventh optical path P7 and eighth optical path P8 are partly superimposed on each other.

The light split by the third beam splitter 231 and output to the third optical path P3 is split into two light beams by the first beam splitter 211, and one light beam is output to the first optical path P1 while the other light beam is output to the fourth optical path P4.

The light output from the first beam splitter 211 to the first optical path P1 is the light obtained when the light beams arriving at the first beam splitter 211 through the second optical path P2 and third optical path P3 are partly superimposed on each other. The light output from the first beam splitter 211 to the fourth optical path P4 is also the light obtained when the light beams arriving at the first beam splitter 211 through the second optical path P2 and third optical path P3 are partly superimposed on each other.

In the optical filter 201, the Michelson interferometer constituted by the first optical system 11 including the first beam splitter 211, the second optical system 21, and the third optical system 131 has a transmission characteristic with a period corresponding to the optical path length difference between the two optical paths. The optical filter 201 can therefore receive signal light of multiple wavelengths ($\lambda_1, \lambda_2, \ldots, \lambda_{2n-1}, \lambda_{2n}, \ldots$) through the first optical path, demultiplex it, and output signal light in a first wavelength range $\Lambda_1$ ($\lambda_1, \lambda_3, \ldots, \lambda_{2n-1}, \ldots$) to the first optical path P1 and signal light in a second wavelength range $\Lambda_2$ ($\lambda_2, \lambda_4, \ldots, \lambda_{2n}, \ldots$) to the fourth optical path P4. In this case, $\lambda_1 < \lambda_2 < \ldots < \lambda_{2n-1} < \lambda_{2n} < \ldots$.

In addition, the transmittances of the optical filter 201 in the first wavelength range $\Lambda_1$ ($\lambda_1, \lambda_3, \ldots, \lambda_{2n-1}, \ldots$) and the second wavelength range $\Lambda_2$ ($\lambda_2, \lambda_4, \ldots, \lambda_{2n}, \ldots$) exhibit a characteristic more excellent in isolation in accordance with the loss characteristics of the second optical system 21 and third optical system 131 as components of the Michelson interferometer. This characteristic can be realized with a very simple arrangement.

Furthermore, the free spectral range determined on the basis of the difference between the optical path lengths d5 and d6 and the free spectral range determined on the basis of the difference between the optical path lengths d7 and d8 each are set to ½ the free spectral range determined on the basis of the difference between the optical path lengths d2 and d3. When, therefore, signal light of multiple wavelengths ($\lambda_1, \lambda_2, \ldots, \lambda_{2n-1}, \lambda_{2n}, \ldots$) is incident on the optical filter 201 of the second embodiment along the first optical path P1, and the free spectral range determined on the basis of the difference between the optical path lengths d5 and d6 and the free spectral range determined on the basis of the difference between the optical path lengths d7 and d8 each correspond to the wavelength interval of the signal light of multiple wavelengths, one of the signal light in the first wavelength range $\Lambda_1$ ($\lambda_1, \lambda_3, \ldots \lambda_{2n-1}, \ldots$) and the signal light in the second wavelength range $\Lambda_2$ ($\lambda_2$, $\lambda_4$, ..., $\lambda_{2n}$, ...) is output from the first optical path P1, and the other light is output from the fourth optical path P4, thus properly realizing a characteristic excellent in isolation.

The first beam splitter 211 has a split ratio of 48% to 52%, and the second beam splitter 221 and third beam splitter 231 each have a split ratio of 24.9% to 28.9%. Therefore, the isolation of the optical filter 200 can be improved to about 40 dB.

The optical filter 201 according to the second embodiment preferably has an isolation of 15 dB or more. In this case, the optical filter 201 can be applied to a wavelength division multiplexing optical communication system.

The optical filter 201 according to the second embodiment preferably has a wavelength dispersion of −5 ps/nm or more and 5 ps/nm or less. In this case, the optical filter 201 can be applied to a wavelength division multiplexing optical communication system, and more specifically, a high-speed wavelength division multiplexing optical communication system with a transmission speed of 40 Gbps.

Figure 5:
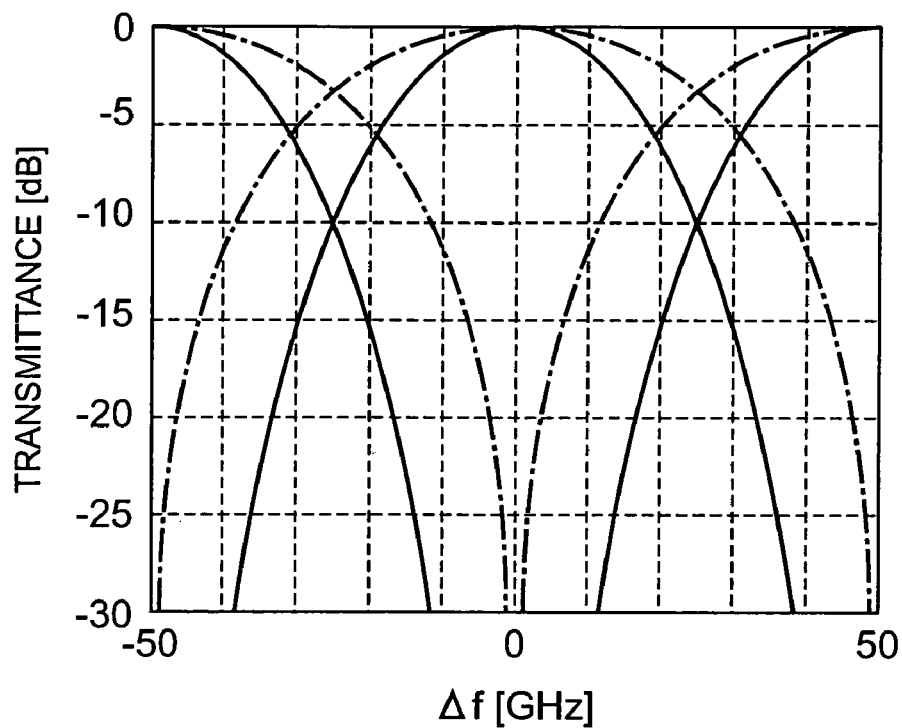
FIG. 5 is a graph showing the transmission characteristic of the optical filter 201 according to the second embodiment.

FIG. 5 is a graph showing the transmission characteristic of the optical filter 201 according to this embodiment. The split ratio of the first beam splitter 211 was set to 50%. The split ratio of each of the second beam splitter 221 and third beam splitter 231 was set to 26.9%. The free spectral range determined on the basis of the difference between the optical path lengths d5 and d6 and the free spectral range determined on the basis of the difference between the optical path lengths d7 and d8 each were set to 50 GHz, and the difference between the optical path lengths d2 and d3 of the second and third optical paths P2 and P3 was set to 1.498570 mm. The free spectral range determined on the basis of the difference between the optical path lengths d2 and d3 was then set to 100 GHz. Referring to FIG. 5, the abscissa represents a deviation $\Delta f$ from the center frequency at a wavelength of 1550.52 nm (frequency: 193.350 THz). In this graph, the chain line represents the transmission characteristic of a conventional optical filter. Obviously, the optical filter 201 according to this embodiment is superior in isolation to the conventional optical filter. The isolation of the optical filter 201 was improved to about 40 dB. Note that there is a difference of 50 GHz between the transmission peak frequency of the transmission characteristic of signal light arriving at the fourth optical path P4 through first optical path P1 and the transmission peak frequency of the transmission characteristic of signal light input through the first optical path P1 and returning to the first optical path P1.

Figure 6:
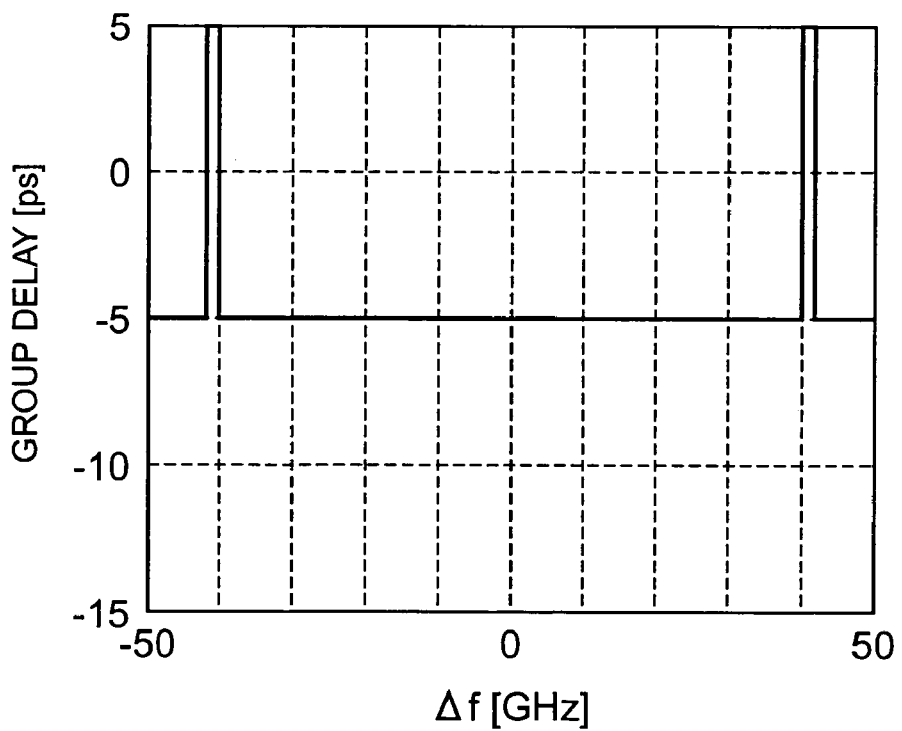
FIG. 6 is a graph showing the group delay characteristic of the optical filter 201 according to the second embodiment.

FIG. 6 is a graph showing the group delay characteristic of the optical filter 201 according to this embodiment. The split ratio of the first beam splitter 211 was set to 50%. The split ratio of each of the second beam splitter 221 and third beam splitter 231 was set to 26.9%. Referring to FIG. 6, the abscissa represents a deviation $\Delta f$ from the center frequency at a wavelength of 1550.52 nm (frequency: 193.350 THz). As shown in FIG. 6, no wavelength dispersion (i.e., the gradient of the group delay characteristic) occurs.

(Third Embodiment)

Figure 7:
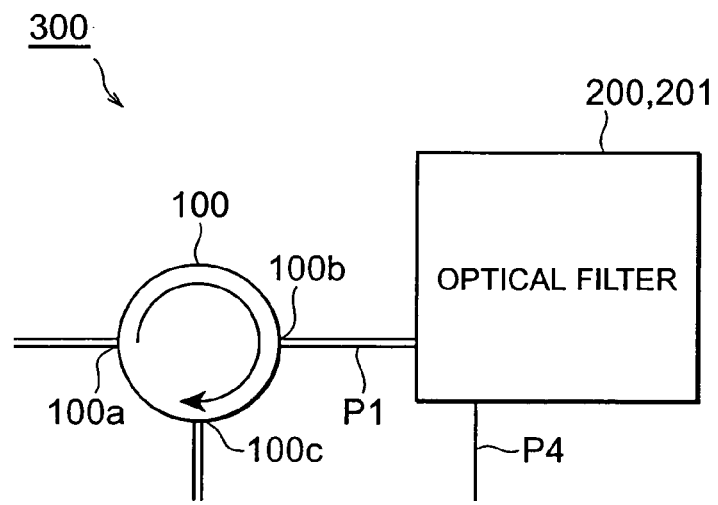
FIG. 7 is a view showing the arrangement of an interleaver 300 according to the third embodiment.

An interleaver according to an embodiment of the present invention will be described next. FIG. 7 is a view showing the arrangement of an interleaver 300 according to this embodiment. The interleaver 300 includes an optical circulator 100 and an optical filter 200 (or optical filter 201) according to an embodiment of the present invention.

The optical circulator 100 has a first terminal 100a, second terminal 100b, and third terminal 100c. Light input to the first terminal 100a is output from the second terminal 100b, and light input to the second terminal 100b is output from the third terminal 100c.

The optical filter 200 is the optical filter according to the above embodiment. A first optical path P1 of the optical filter 200 is connected to the second terminal 100b of the optical circulator 100.

The interleaver 300 operates as follows. Signal light of multiple wavelengths ($\lambda_1$, $\lambda_2$, ..., $\lambda_{2n-1}$, $\lambda_{2n}$, ...) input to the first terminal 100a of the optical circulator 100 is output from the second terminal 100b of the optical circulator 100 and input to the first optical path P1 of the optical filter 200. The signal light of the multiple wavelengths input through the first optical path P1 of the optical filter 200 is selected by and transmitted through the optical filter 200, and one of signal light in a first wavelength range $\Lambda_1$ ($\lambda_1$, $\lambda_3$, ..., $\lambda_{2n-1}$, ...) and signal light in a second wavelength range $\Lambda_2$ ($\lambda_2$, $\lambda_4$, ..., $\lambda_{2n}$, ...) is output through the first optical path P1 while the other signal light is output through a fourth optical path P4. The signal light output through the first optical path P1 of the optical filter 200 is input to the second terminal 100b of the optical circulator 100 and output from the third terminal 100c of the optical circulator 100. As a consequence, the signal light of the multiple wavelengths ($\lambda_1$, $\lambda_2$, ..., $\lambda_{2n-1}$, $\lambda_{2n}$, ...) is demultiplexed into the signal light in the first wavelength range $\Lambda_1$ ($\lambda_1$, $\lambda_3$, ..., $\lambda_{2n-1}$, ...) and the signal light in the second wavelength range $\Lambda_2$ ($\lambda_2$, $\lambda_4$, ..., $\lambda_{2n}$, ...) by the interleaver 300. In this case, $\lambda_1 < \lambda_2 < ... < \lambda_{2n-1} < \lambda_{2n} < ...$.

In addition, since the interleaver 300 has the optical filter 200 (or optical filter 201) excellent in isolation according to the above embodiment, the interleaver exhibits an excellent demultiplexing characteristic.

(Fourth Embodiment)

Figure 8:
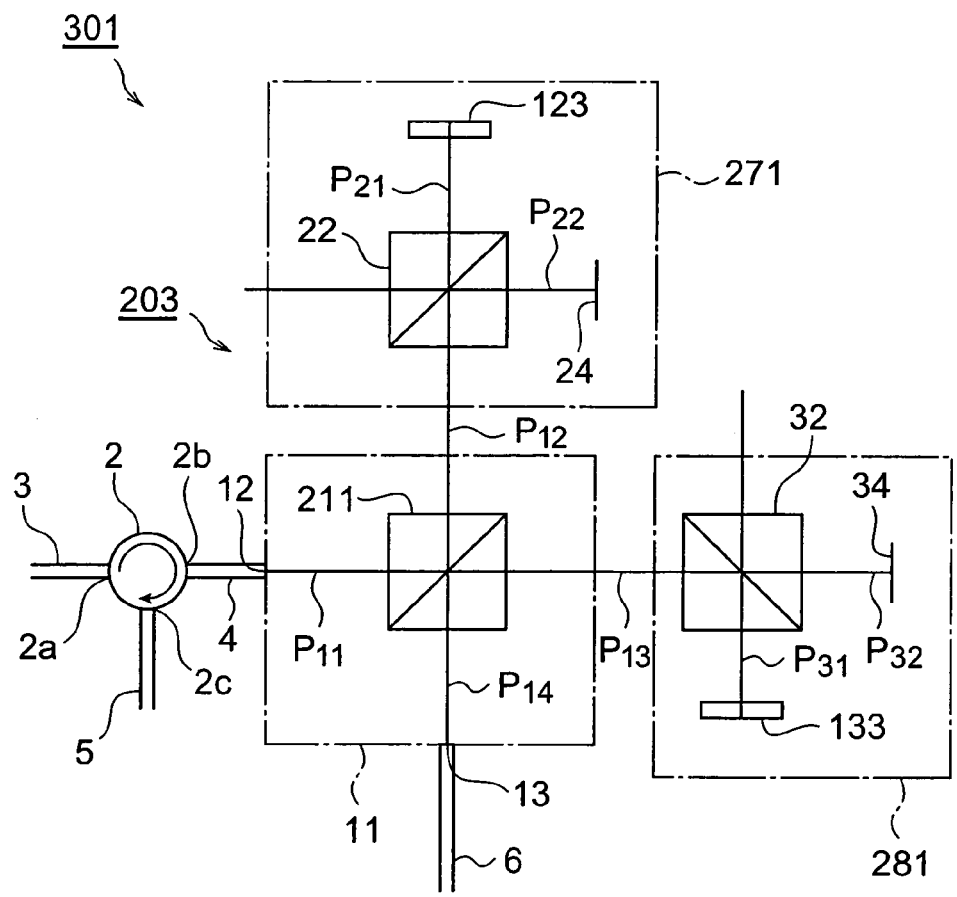
FIG. 8 is a view showing the arrangement of an interleaver 301 according to the fourth embodiment.

Another interleaver according to the present invention will be described next. FIG. 8 is a view showing the arrangement of the interleaver according to this embodiment. An interleaver 301 includes an optical filter 203 including a first optical system 11, second optical system 271, and third optical system 281, and an optical circulator 2.

The optical circulator 2 has a first terminal 2a, second terminal 2b, and third terminal 2c. Light input to the first terminal 2a through an optical fiber 3 is output from the second terminal 2b to an optical fiber 4, and light input to the second terminal 2b through the optical fiber 4 is output from the third terminal 2c to an optical fiber 5.

The first optical system 11 has a first port 12, second port 13, and first beam splitter 211. The first beam splitter 211 splits light input to the first port 12 and arriving through a first optical path $P_{11}$ into two light beams, and outputs one light beam to a second optical path $P_{12}$ and the other light beam to a third optical path $P_{13}$. The first beam splitter 211 also splits light output and arriving from a second optical system 21 into two light beams, and outputs the light beams to the first optical path $P_{11}$ and a fourth optical path $P_{14}$, respectively. The first beam splitter 211 splits light output and arriving from a third optical system 31 into two light beams, and outputs the light beams to the first optical path $P_{11}$ and fourth optical path $P_{14}$, respectively.

The second optical system 271 is designed to output the light, output from the first beam splitter 211 to the second optical path $P_{12}$ and arriving at the second optical system 271, after giving the light an intensity change having wavelength dependence and a phase change. The second optical system 271 has a second beam splitter 22, first etalon filter 123, and second reflecting mirror 24. The second optical system 271 including the second beam splitter 22, first etalon filter 123, and second reflecting mirror 24 forms a Michelson interferometer. That is, light arriving at the second beam splitter 22 through the second optical path $P_{12}$ is split into two light beams, and the light beams are respectively output to the first etalon filter 123 and the second reflecting mirror 24. The light reflected by the first etalon filter 123 and arriving at the second beam splitter 22 is then split into two light beams, and one light beam is output toward the second optical path $P_{12}$ (first beam splitter 211). In addition, the light reflected by the second reflecting mirror 24 and arriving at the second beam splitter 22 is split into two light beams, and one light beam is output to the second optical path $P_{12}$ (first beam splitter 211).

The first etalon filter 123 is a loss filter using multiple reflection between two or more planes, and has a loss characteristic of periodically changing the loss in accordance with a wavelength. The first etalon filter 123 is designed to minimize the loss of light arriving from the second beam splitter 22 at each wavelength. The first etalon filter 123 gives a loss to light arriving from the second beam splitter 22, and outputs the resultant light to the second beam splitter 22.

The third optical system 281 gives a phase change and an intensity change with wavelength dependence to light output from the first beam splitter 211 to the third optical path $P_{13}$ and arriving at the third optical system 281. The third optical system 281 has a third beam splitter 32 different from the first beam splitter 211, a second etalon filter 133, and a fourth reflecting mirror 34. The third optical system 281 including the third beam splitter 32, second etalon filter 133, and fourth reflecting mirror 34 forms a Michelson interferometer. That is, light arriving at the third beam splitter 32 through the third optical path $P_{13}$ is split into two light beams, and the light beams are output to the second etalon filter 133 and fourth reflecting mirror 34, respectively. The light reflected by the fourth reflecting mirror 34 and arriving at the third beam splitter 32 is then split into two light beams, and one light beam is output toward the third optical path $P_{13}$ (first beam splitter 211). In addition, the light reflected by the fourth reflecting mirror 34 and arriving at the third beam splitter 32 is split into two light beams, and one light beam is output to the third optical path $P_{13}$ (first beam splitter 211).

The second etalon filter 133 is a loss filter using multiple reflection between two or more planes, and has a loss characteristic of periodically changing the loss in accordance with a wavelength. The second etalon filter 133 is designed to minimize the loss of light arriving from the third beam splitter 32 at each wavelength. The second etalon filter 133 gives a loss to light arriving from the third beam splitter 32, and outputs the resultant light to the third beam splitter 32.

The free spectral range of each of the first etalon filter 123 and second etalon filter 133 is set to ½ the free spectral range determined on the basis of the difference between the interval between the first beam splitter 211 and the second beam splitter 22 (the interval (optical path difference) between the splitting point of light at the first beam splitter 211 and the splitting point of light at the second beam splitter 22) and the interval between the first beam splitter 211 and the third beam splitter 32 (the interval (optical path difference) between the splitting point of light at the first beam splitter 211 and the splitting point of light at the third beam splitter 32).

The light input to the first beam splitter 211 through the first optical path $P_{11}$ is split into two light beams by the first beam splitter 211, and one light beam is output to the second optical path $P_{12}$ while the other light beam is output to the third optical path $P_{13}$. When the light output from the first beam splitter 211 to the second optical path $P_{12}$ arrives at the second beam splitter 22, the light is split into two light beams by the second beam splitter 22. One light beam is then output to an optical path $P_{21}$, and the other light beam is output to an optical path $P_{22}$.

The light output from the second beam splitter 22 to the optical path $P_{21}$ is reflected by the first etalon filter 123 and propagates through the optical path $P_{21}$ in reverse to return to the second beam splitter 22. The light is then split into two light beams by the second beam splitter 22, and one light beam is then output to the second optical path $P_{12}$. The light output from the second beam splitter 22 to the optical path $P_{22}$ is reflected by the second reflecting mirror 24 and propagates through the optical path $P_{22}$ in reverse to return to the second beam splitter 22. The light is then split into two light beams by the second beam splitter 22, and one light beam is then output to the second optical path $P_{12}$.

When the light output from the first beam splitter 211 to the third optical path $P_{13}$ arrives at the third beam splitter 32, the light is split into two light beams by the third beam splitter 32. One light beam is output to an optical path $P_{31}$, and the other light beam is output to an optical path $P_{32}$. The light output from the third beam splitter 32 to the optical path $P_{31}$ is reflected by the second etalon filter 133 and propagates through the optical path $P_{31}$ in reverse to return to the third beam splitter 32. The light is then split into two light beams by the third beam splitter 32, and one light beam is then output to the third optical path $P_{13}$. The light output from the third beam splitter 32 to the optical path $P_{32}$ is reflected by the fourth reflecting mirror 34 and propagates through the optical path $P_{32}$ in reverse to return to the third beam splitter 32. The light is then split into two light beams by the third beam splitter 32, and one light beam is output to the third optical path $P_{13}$.

The interleaver 301 including the optical filter 203 operates as follows. Light input to the first terminal 2a of the optical circulator 2 through the optical fiber 3 is output to the second terminal 2b and input from the first port 12 to the first optical system 11 through the optical fiber 4. The light input from the first port 12 of the first optical system 11 is output to the first optical path $P_{11}$. The light input to the first beam splitter 211 through the first optical path $P_{11}$ is split into two light beams by the first beam splitter 211. These light beams are output to the second optical path $P_{12}$ and third optical path $P_{13}$, respectively.

The light output to the second optical path $P_{13}$ is split into two light beams by the second beam splitter 22 and output to the optical path $P_{21}$. The light output to the optical path $P_{21}$ propagates to the first etalon filter 123 and returns therefrom to the second beam splitter 22. The light input to the second beam splitter 22 is split into two light beams by the second beam splitter 22, and one light beam is output to the second optical path $P_{12}$. The light output to the optical path $P_{22}$ propagates to the fourth reflecting mirror 34 and returns therefrom to the second beam splitter 22. The light input to the second beam splitter 22 is split into two light beams by the second beam splitter 22, and one light beam is output to the second optical path $P_{12}$. The light output from the second beam splitter 22 to the second optical path $P_{12}$ is the light obtained when the light beams arriving at the second beam splitter 22 through the optical path $P_{21}$ and optical path $P_{22}$ are partly superimposed on each other.

The light output to the third optical path $P_{13}$ is split into two light beams by the third beam splitter 32 and output to the optical path $P_{31}$. The light output to the optical path $P_{31}$ propagates to the second etalon filter 133 and returns therefrom to the third beam splitter 32. The light input to the third beam splitter 32 is split into two light beams by the third beam splitter 32, and one light beam is output to the third optical path $P_{13}$. The light output to the optical path $P_{32}$ propagates to the fourth reflecting mirror 34 and returns therefrom to the third beam splitter 32. The light input to the third beam splitter 32 is split into two light beams by the third beam splitter 32, one light beam is output to the third optical path $P_{13}$. The light output from the third beam splitter 32 to the third optical path $P_{13}$ is the light obtained when the light beams arriving at the third beam splitter 32 through the optical path $P_{31}$ and optical path $P_{32}$ are partly superimposed on each other.

The light input to the first beam splitter 211 through the second optical path $P_{12}$ is split into two light beams by the first beam splitter 211. These light beams are output to the first optical path $P_{11}$ and fourth optical path $P_{14}$, respectively. The light input to the first beam splitter 211 through the third optical path $P_{13}$ is split into two light beams by the first beam splitter 211. These light beams are output to the first optical path $P_{11}$ and fourth optical path $P_{14}$, respectively. The light output from the first beam splitter 211 to the first optical path $P_{11}$ is the light obtained when the light beams arriving at the first beam splitter 211 through the second optical path $P_{12}$ and third optical path $P_{13}$ are partly superimposed on each other. This light is output from the first port 12 to the optical fiber 4. The light output to the optical fiber 4 is input to the first terminal 2a of the optical circulator 2 and output from the third terminal 2c to the optical fiber 5. The light output from the first beam splitter 211 to the fourth optical path $P_{14}$ is also the light obtained when the light beams arriving at the first beam splitter 211 through the second optical path $P_{12}$ and third optical path $P_{13}$ are partly superimposed on each other. This light is output to the optical fiber 6 through a second port 13.

In the interleaver 301 including the optical filter 203, the Michelson interferometer constituted by the first optical system 11 including the first beam splitter 211, the second optical system 271, and the third optical system 281 has a transmission characteristic with a period corresponding to the optical path length difference between the two optical paths. The interleaver 301 including the optical filter 203 can therefore receive signal light of multiple wavelengths ($\lambda_1$, $\lambda_2$, ..., $\lambda_{2n-1}$, $\lambda_{2n}$, ...) through the optical fiber 3, demultiplex it, and output signal light in a first wavelength range $\Lambda_1$ ($\lambda_1, \lambda_3, ..., \lambda_{2n-1}, ...$) to the optical fiber 5 and signal light in a second wavelength range $\Lambda_2$ ($\lambda_2, \lambda_4, ..., \lambda_{2n}, ...$) to the optical fiber 6. In this case, $\lambda_1 < \lambda_2 < ... < \lambda_{2n-1} < \lambda_{2n} < ....$ In addition, the insertion losses (transmission characteristic) of the interleaver 301 including the optical filter 203 in the first wavelength range $\Lambda_1$ ($\lambda_1, \lambda_3, ..., \lambda_{2n-1}, ...$) and the second wavelength range $\Lambda_2$ ($\lambda_2, \lambda_4, ..., \lambda_{2n}, ...$) exhibit a characteristic excellent in isolation in accordance with the loss characteristics of the first etalon filter 123 included in the second optical system 121 as a component of the Michelson interferometer and the second etalon filter 133 included in the third optical system 131 as a component of the Michelson interferometer. This characteristic can be realized with a very simple arrangement.

In addition, each of the free spectral ranges of the first etalon filter 123 and second etalon filter 133 is set to ½ the free spectral range determined on the basis of the optical path difference between the first beam splitter 211 and the second beam splitter 22 and the optical path difference between the first beam splitter 211 and the third beam splitter 32. When, therefore, signal light of multiple wavelengths ($\lambda_1, \lambda_2, ..., \lambda_{2n-1}, \lambda_{2n}, ...$) is incident on the optical filter 203 of the fourth embodiment along the first optical path $P_{11}$, and each of the free spectral ranges of the first etalon filter 123 and second etalon filter 133 corresponds to the wavelength intervals of the signal light of the multiple wavelengths, one of the signal light in the first wavelength range $\Lambda_1$ ($\lambda_1, \lambda_3, ..., \lambda_{2n-1}, ...$) and the signal light in the second wavelength range $\Lambda_2$ ($\lambda_2, \lambda_4, ..., \lambda_{2n}, ...$) is output through the first optical path $P_{11}$ while the other is output to the fourth optical path $P_{14}$, thus further properly improving the isolation.

In this case, if the split ratio of the first beam splitter 211 is set to 48% to 52%, and each of the split ratios of the second and third beam splitters 22 and 32 is set to 24.9% to 28.9%, the isolation of the optical filter 203 can be greatly improved to about 40 dB.

The optical filter 203 according to the fourth embodiment preferably has an isolation of 15 dB or more. In this case, the optical filter 203 can be applied to a wavelength division multiplexing optical communication system.

The optical filter 203 according to the fourth embodiment preferably has a wavelength dispersion of −5 ps/nm or more and 5 ps/nm or less. In this case, the optical filter 203 can be applied to a wavelength division multiplexing optical communication system, and more specifically, a high-speed wavelength division multiplexing optical communication system with a transmission speed of 40 Gbps.

(Fifth Embodiment)

Figure 9:
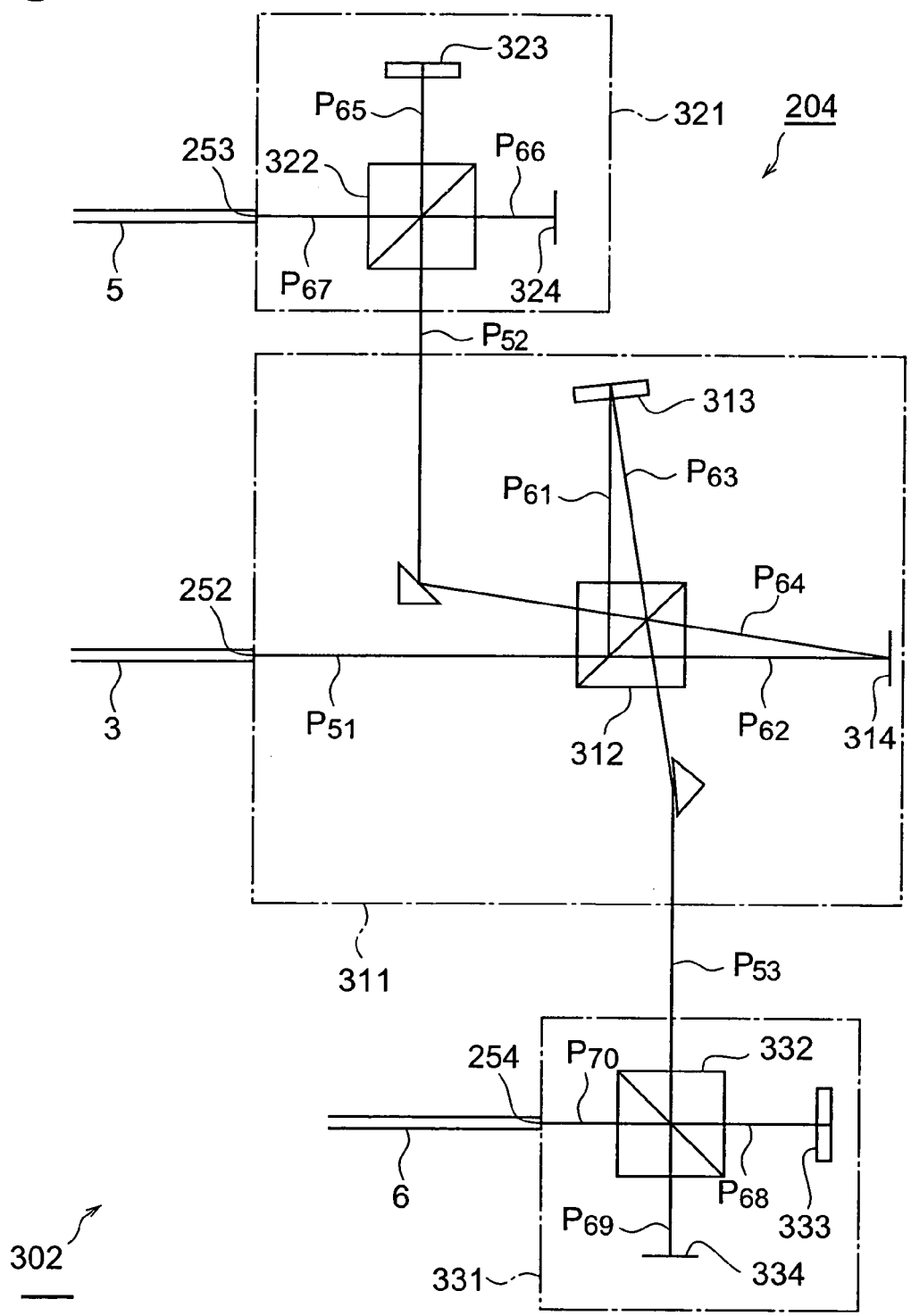
FIG. 9 is a view showing the arrangement of an interleaver 302 according to the fifth embodiment.

Still another interleaver according to the present invention will be described next. FIG. 9 is a view showing the arrangement of the interleaver according to this embodiment. An interleaver 302 includes an optical filter 204 including a first port 252, a second port 253, a third port 254, a first optical system 311, second optical system 321, and a third optical system 331, an optical fiber 3, an optical fiber 5, and an optical fiber 6.

The first optical system 311 has a first beam splitter 312, first etalon filter 313, and first reflecting mirror 314. The first optical system 311 including the first beam splitter 312, first etalon filter 313, and first reflecting mirror 314 forms a Michelson interferometer. That is, light arriving at the first beam splitter 312 through a first optical path $P_{51}$ is split into two light beams. These light beams are output to the first etalon filter 313 and first reflecting mirror 314, respectively. The light reflected by the first etalon filter 313 and arriving at the first beam splitter 312 is split into two light beams. These light beams are output to a second optical path $P_{52}$ and third optical path $P_{53}$, respectively. In addition, the light reflected by the first reflecting mirror 314 and arriving at the first beam splitter 312 is split into two light beams. These light beams are output to the second optical path $P_{52}$ and third optical path $P_{53}$, respectively. The first optical system 311 gives light arriving at the first optical system 311 a phase change and an intensity change with wavelength dependence, and outputs the resultant light.

The first etalon filter 313 is a loss filter using multiple reflection between two or more planes, and has a loss characteristic of periodically changing the loss in accordance with a wavelength. The first etalon filter 313 is designed to minimize the loss of light arriving from the first beam splitter 312 at each wavelength. The first etalon filter 313 gives a loss to light arriving from the first beam splitter 312, and outputs the resultant light to the first beam splitter 312.

The free spectral range of the first etalon filter 313 is set to ½ the free spectral range determined on the basis of the difference between the interval between the first beam splitter 312 and the first etalon filter 313 (the interval (optical path difference) between the splitting point of light at the first beam splitter 312 and the reflecting point of light at the first etalon filter 313) and the interval between the first beam splitter 312 and the first reflecting mirror 314 (the internal (optical path difference) between the splitting point of light at the first beam splitter 312 and the reflecting point of light at the first reflecting mirror 314).

The second optical system 321 outputs the light, output from the first beam splitter 312 (first optical system 311) to the second optical path $P_{52}$ and arriving at the second optical system 321, after giving the light an intensity change with wavelength dependence and a phase change. The second optical system 321 has a second beam splitter 322, second etalon filter 323, and second reflecting mirror 324. The second optical system 321 including the second beam splitter 322, second etalon filter 323, and second reflecting mirror 324 forms a Michelson interferometer. That is, light arriving at the second beam splitter 322 through a second optical path $P_{52}$ is split into two light beams. These light beams are output to the second etalon filter 323 and second reflecting mirror 324, respectively. The light reflected by the second etalon filter 323 and arriving at the second beam splitter 322 is split into two light beams, and one light beam is output to the second port 253. In addition, the light reflected by the second reflecting mirror 324 and arriving at the second beam splitter 322 is split into two light beams, and one light beam is output to the second port 253.

The second etalon filter 323 is a loss filter using multiple reflection between two or more planes, and has a loss characteristic of periodically changing the loss in accordance with a wavelength. The second etalon filter 323 is designed to minimize the loss of light arriving from the second beam splitter 322 at each wavelength. The second etalon filter 323 gives a loss to light arriving from the second beam splitter 322, and outputs the resultant light to the second beam splitter 322.

The free spectral range of the second etalon filter 323 is set to ½ the free spectral range determined on the basis of the difference between the interval between the second beam splitter 322 and the second etalon filter 323 (the interval (optical path difference) between the splitting point of light at the second beam splitter 322 and the reflecting point of light at the second etalon filter 323) and the interval between the second beam splitter 322 and the second reflecting mirror 324 (the internal (optical path difference) between the splitting point of light at the second beam splitter 322 and the reflecting point of light at the second reflecting mirror 324).

The third optical system 331 outputs the light, output from the first beam splitter 312 (first optical system 311) to the third optical path $P_{53}$ and arriving at the third optical system 331, after giving the light an intensity change with wavelength dependence and a phase change. The third optical system 331 has a third beam splitter 332, third etalon filter 333, and third reflecting mirror 334. The third optical system 331 including the third beam splitter 332, third etalon filter 333, and third reflecting mirror 334 forms a Michelson interferometer. That is, light arriving at the third beam splitter 332 through third optical path $P_{53}$ is split into two light beams. These light beams are output to the third etalon filter 333 and third reflecting mirror 334, respectively. The light reflected by the third etalon filter 333 and arriving at the third beam splitter 332 is split into two light beams, and one light beam is output to the third port 254. In addition, the light reflected by the third reflecting mirror 334 and arriving at the third beam splitter 332 is split into two light beams, and one light beam is output to the third port 254.

The third etalon filter 333 is a loss filter using multiple reflection between two or more planes, and has a loss characteristic of periodically changing the loss in accordance with a wavelength. The third etalon filter 333 is designed to minimize the loss of light arriving from the third beam splitter 332 at each wavelength. The third etalon filter 333 gives a loss to light arriving from the third beam splitter 332, and outputs the resultant light to the third beam splitter 332.

The free spectral range of the third etalon filter 333 is set to ½ the free spectral range determined on the basis of the difference between the interval between the third beam splitter 332 and the third etalon filter 333 (the interval (optical path difference) between the splitting point of light at the third beam splitter 332 and the reflecting point of light at the third etalon filter 333) and the interval between the third beam splitter 332 and the third reflecting mirror 334 (the internal (optical path difference) between the splitting point of light at the third beam splitter 332 and the reflecting point of light at the third reflecting mirror 334).

The light input to the first beam splitter 312 through the first optical path $P_{51}$ is split into two light beams by the first beam splitter 312, and one light beam is output to a optical path $P_{61}$ while the other light beam is output to an optical path $P_{62}$. The light output from the first beam splitter 312 to the optical path $P_{61}$ is reflected by the first etalon filter 313, propagates through an optical path $P_{63}$, and returns to the first beam splitter 312. The light is then split into two light beams by the beam splitter, and one light beam is output to the second optical path $P_{52}$ while the other light beam is output to the third optical path $P_{53}$. The light output from the first beam splitter 312 to the optical path $P_{62}$ is reflected by the first reflecting mirror 314, propagates through an optical path $P_{64}$, and returns to the first beam splitter 312. The light is then split into two light beams by the first beam splitter 312, and one light beam is output to the second optical path $P_{52}$ while the other light beam is output to the third optical path $P_{53}$.

When the light output from the first optical system 311 (first beam splitter 312) to the second optical path $P_{52}$ arrives at the second beam splitter 322, the light is split into two light beams by the second beam splitter 322. One light beam is output to an optical path $P_{65}$, and the other light beam is output to an optical path $P_{66}$. The light output from the second beam splitter 322 to the optical path $P_{65}$ is reflected by the second etalon filter 323, propagates through the optical path $P_{65}$ in reverse, and returns to the second beam splitter 322. The light is then split into two light beams by the second beam splitter 322, and one light beam is output to an optical path $P_{67}$. The light output from the second beam splitter 322 to the optical path $P_{66}$ is reflected by the second reflecting mirror 324, propagates through the optical path $P_{66}$ in reverse, and returns to the second beam splitter 322. The light is then split into two light beams by the second beam splitter 322, and one light beam is output to the optical path $P_{67}$.

When the light output from the first optical system 311 (first beam splitter 312) to the third optical path $P_{53}$ arrives at the third beam splitter 332, the light is split into two light beams by the third beam splitter 332. One light beam is output to an optical path $P_{68}$, and the other light beam is output to an optical path $P_{69}$. The light output from the third beam splitter 332 to the optical path $P_{68}$ is reflected by the third etalon filter 333, propagates through the optical path $P_{68}$ in reverse, and returns to the third beam splitter 332. The light is then split into two light beams by the third beam splitter 332, and one light beam is output to an optical path $P_{70}$. The light output from the third beam splitter 332 to the optical path $P_{69}$ is reflected by the third reflecting mirror 334, propagates through the optical path $P_{69}$ in reverse, and returns to the third beam splitter 332. The light is then split into two light beams by the third beam splitter 332, and one light beam is output to the optical path $P_{70}$.

The interleaver 302 including the optical filter 204 operates as follows. Light input to the first port 252 through the optical fiber 3 is output to the first optical path $P_{51}$. The light input to the first beam splitter 312 through the first optical path $P_{51}$ is split into two light beams by the first beam splitter 312. These light beams are-output to the optical path $P_{61}$ and optical path $P_{62}$, respectively. The light output to the optical path $P_{61}$ propagates to the first etalon filter 313 and returns therefrom to the first beam splitter 312 through the optical path $P_{63}$. The light input to the first beam splitter 312 through the optical path $P_{63}$ is split into two light beams by the first beam splitter 312. These light beams are output to the second optical path $P_{52}$ and third optical path $P_{53}$, respectively. The light output to the optical path $P_{62}$ propagates to the first reflecting mirror 314 and returns therefrom to the first beam splitter 312 through the optical path $P_{64}$. The light input to the first beam splitter 312 through the optical path $P_{64}$ is split into two light beams by the first beam splitter 312. These light beams are output to the second optical path $P_{52}$ and third optical path $P_{53}$, respectively. The light output from the first beam splitter 312 to the second optical path $P_{52}$ is the light obtained when the light beams arriving at the first beam splitter 312 through the optical path $P_{63}$ and optical path $P_{64}$ are partly superimposed on each other. The light output from the first beam splitter 312 to the third optical path $P_{53}$ is the light obtained when the light beams arriving at the first beam splitter 312 through the optical path $P_{63}$ and optical path $P_{64}$ are partly superimposed on each other.

The light output to the second optical path $P_{52}$ is split into two light beams by the second beam splitter 322. These light beams are output to the optical path $P_{65}$ and optical path $P_{66}$, respectively. The light output to the optical path $P_{65}$ propagates to the second etalon filter 323 and returns therefrom to the second beam splitter 322. The light input to the second beam splitter 322 is split into two light beams by the second beam splitter 322, and one light beam is output to the optical path $P_{67}$. The light output to the optical path $P_{66}$ propagates to the second reflecting mirror 324 and returns therefrom to the second beam splitter 322. The light input to the second beam splitter 322 is split into two light beams by the second beam splitter 322, and one light beam is output to the optical path $P_{67}$. The light output from the second beam splitter 322 to the optical path $P_{67}$ is the light obtained when the light beams arriving at the second beam splitter 322 through the optical path $P_{65}$ and optical path $P_{66}$ are partly superimposed on each other. This light is output to the optical fiber 5 through the second port 253.

The light output to the third optical path $P_{53}$ is split into two light beams by the third beam splitter 332. These light beams are output to the optical path $P_{68}$ and optical path $P_{69}$, respectively. The light output to the optical path $P_{68}$ propagates to the third etalon filter 333 and returns therefrom to the third beam splitter 332. The light input to the third beam splitter 332 is split into two light beams by the third beam splitter 332, and one light beam is output to the optical path $P_{70}$. The light output to the optical path $P_{69}$ propagates to the third reflecting mirror 334 and returns therefrom to the third beam splitter 332. The light input to the third beam splitter 332 is split into two light beams by the third beam splitter 332, and one light beam is output to the optical path $P_{70}$. The light output from the third beam splitter 332 to the optical path $P_{70}$ is the light obtained when the light beams arriving at the third beam splitter 332 through the optical path $P_{68}$ and optical path $P_{69}$ are partly superimposed on each other. This light is output to the optical fiber 6 through the third port 254.

In the interleaver 302 including the optical filter 204, the first optical system 311, second optical system 321, and third optical system 331 constituting the Michelson interferometer each have a transmission characteristic with a period corresponding to the optical path length difference between the two optical paths. The interleaver 302 including the optical filter 204 can therefore receive signal light of multiple wavelengths ($\lambda_1, \lambda_2, \ldots, \lambda_{2n-1}, \lambda_{2n}, \ldots$) through the optical fiber 3, demultiplex it, and output signal light in a first wavelength range $\Lambda_1$ ($\lambda_1, \lambda_3, \ldots, \lambda_{2n-1}, \ldots$) to the optical fiber 5 and signal light in a second wavelength range $\Lambda_2$ ($\lambda_2, \lambda_4, \ldots, \lambda_{2n}, \ldots$) to the optical fiber 6. In this case, $\lambda_1 < \lambda_2 < \ldots < \lambda_{2n-1} < \lambda_{2n} < \ldots$.

In addition, the insertion losses (transmission characteristic) of the interleaver 302 including the optical filter 204 in the first wavelength range $\Lambda_1$ ($\lambda_1, \lambda_3, \ldots, \lambda_{2n-1}, \ldots$) and the second wavelength range $\Lambda_2$ ($\lambda_2, \lambda_4, \ldots, \lambda_{2n}, \ldots$) exhibit a characteristic excellent in isolation in accordance with the loss characteristics of the first etalon filter 313 included in the first optical system 311 as a component of the Michelson interferometer, the second etalon filter 323 included in the third optical system 321 as a component of the Michelson interferometer, and the third etalon filter 333 included in the third optical system 331 as a component of the Michelson interferometer. This characteristic can be realized with a very simple arrangement.

In addition, each of the free spectral ranges of the second etalon filter 323 and third etalon filter 333 is set to ½ the free spectral range determined on the basis of the optical path difference between the first beam splitter 312 and the first etalon filter 313 and the optical path difference between the first beam splitter 312 and the first reflecting mirror 314. When, therefore, signal light of multiple wavelengths ($\lambda_1, \lambda_2, \ldots, \lambda_{2n-1}, \lambda_{2n}, \ldots$) is incident on the optical filter 204 of the fifth embodiment along the first optical path $P_{51}$, and each of the free spectral ranges of the second etalon filter 323 and third etalon filter 333 corresponds to the wavelength intervals of the signal light of the multiple wavelengths, one of the signal light in the first wavelength range $\Lambda_1$ ($\lambda_1, \lambda_3, \ldots, \lambda_{2n-1}, \ldots$) and the signal light in the second wavelength range $\Lambda_2$ ($\lambda_2, \lambda_4, \ldots, \lambda_{2n}, \ldots$) is output through the optical path $P_{67}$, and the other signal light is output through the optical path $P_{70}$, thus further properly improving the isolation.

Figure 10:
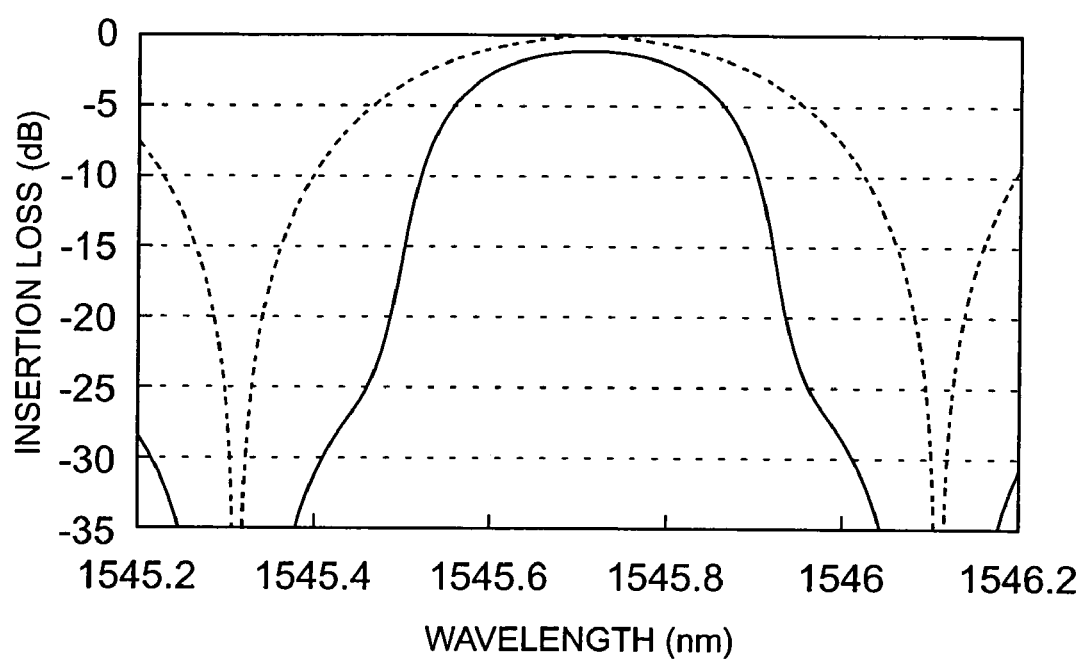
FIG. 10 is a graph showing an insertion loss characteristic of the interleaver according to the fifth embodiment.

A check result on the insertion loss characteristic of the interleaver 302 having the above arrangement will be described next with reference to FIG. 10. FIG. 10 shows the insertion loss of signal light output from the optical fiber 5 in the interleaver 302 with respect to each frequency. Note that the insertion loss of signal light output from the optical fiber 6 in the interleaver 302 with respect to each frequency differs in wavelength from the characteristic shown in FIG. 10 by 0.4 nm.

In this case, the free spectral range and crosstalk of each of the etalon filters 313, 323, and 333 are set to 50 GHz and 6 dB, respectively. A difference of 1.498570 mm is set between the interval between each of the beam splitters 312, 233, and 332 and a corresponding one of the etalon filters 313, 323, and 333 (the interval (optical path difference) between the splitting point of light at each of the beam splitters 312, 322, and 332 and the reflecting point of light at a corresponding one of the etalon filters 313, 323, and 333) and the interval between each of the beam splitters 312, 322, and 332 and a corresponding one of the reflecting mirrors 314, 324, and 334 (the interval (optical path difference) between the splitting point of light at each of the beam splitters 312, 322, and 332 and the reflecting point of light at a corresponding one of the reflecting mirrors 314, 324, and 334). The free spectral range determined from the difference of 1.498570 mm becomes 100 GHz.

As is obvious from FIG. 10, the interleaver 302 including the optical filter 204 exhibits characteristics excellent in isolation. Referring to FIG. 10, the broken lines represent the loss characteristic of an interleaver using a conventional Michelson interferometer.

The optical filter 204 according to the fifth embodiment preferably has an isolation of 15 dB or more. In this case, the optical filter 204 can be applied to a wavelength division multiplexing optical communication system.

The optical filter 204 according to the fifth embodiment preferably has a wavelength dispersion of −5 ps/nm or more and 5 ps/nm or less. In this case, the optical filter 201 can be applied to a wavelength division multiplexing optical communication system, and more specifically, a high-speed wavelength division multiplexing optical communication system with a transmission speed of 40 Gbps.

(Sixth Embodiment)

Figure 11:
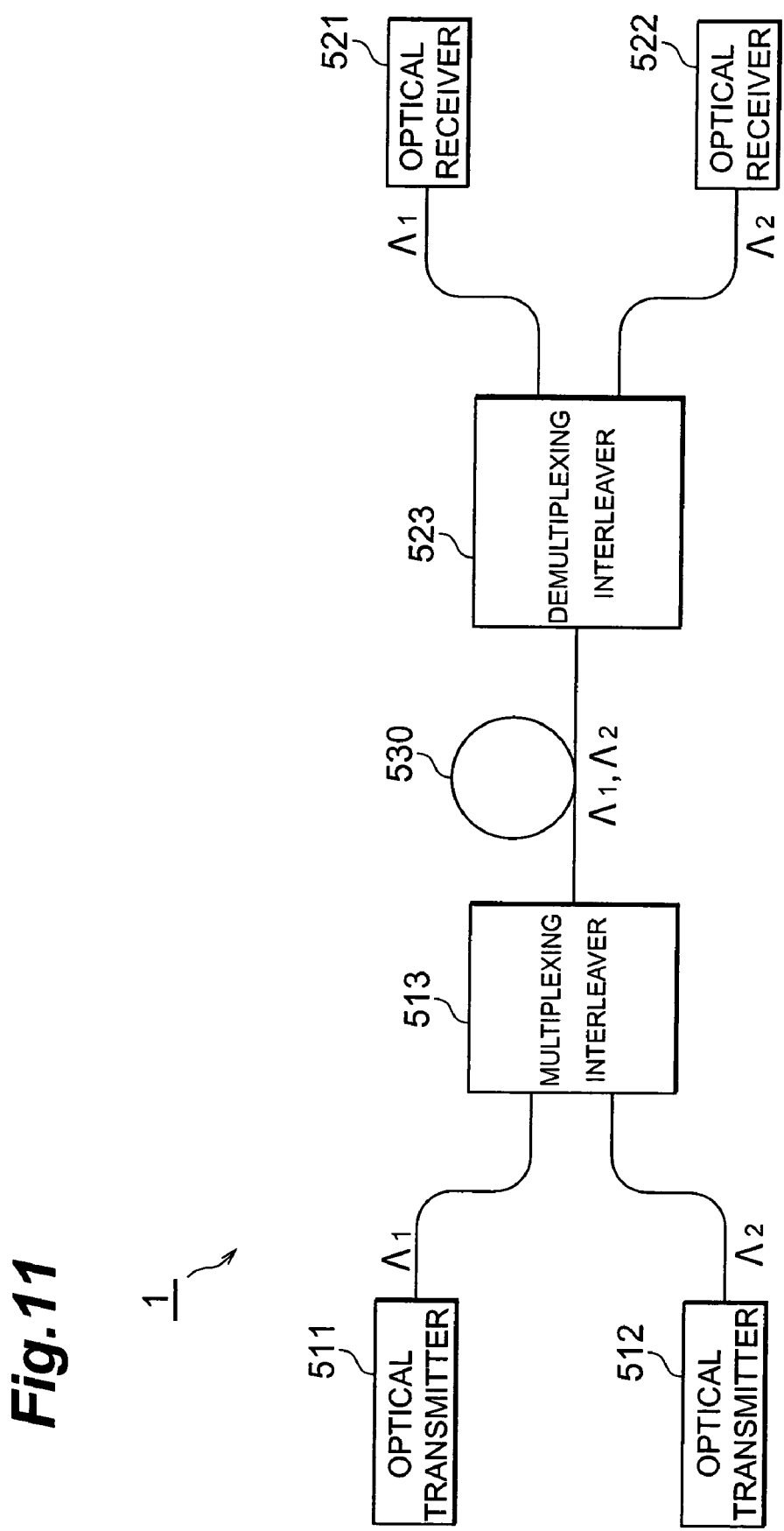
FIG. 11 is a view showing the arrangement of an optical communication system 1 according to the sixth embodiment.

An optical communication system 1 according to this embodiment will be described next. FIG. 11 is a view showing the arrangement of the optical communication system 1 according to this embodiment. The optical communication system 1 includes optical transmitters 511 and 512, a multiplexing interleaver 513, an optical fiber transmission path 530, a demultiplexing interleaver 523, and optical receivers 521 and 522. The demultiplexing interleaver 523 has the same arrangement as that of the interleaver 300 described above. In this case, the interleaver 301 or 302 may be used in place of the interleaver 300.

One optical transmitter 511 multiplexes signal light beams in a first wavelength range $\Lambda_1$ ($\lambda_1, \lambda_3, \ldots, \lambda_{2n-1}, \ldots$) and outputs the resultant light. The other optical transmitter 512 multiplexes signal light beams in a second wavelength range $\Lambda_2$ ($\lambda_2, \lambda_4, \ldots \lambda_{2n}, \ldots$) and outputs the resultant light. The multiplexing interleaver 513 receives the signal light of the multiple wavelengths in the first wavelength range $\Lambda_1$ output from the optical transmitter 511 and the signal light of the multiple wavelengths in the second wavelength range $\Lambda_2$ output from the optical transmitter 512, multiplexes them, and sends out the resultant light to the optical fiber transmission path 530. The demultiplexing interleaver 523 demultiplexes the signal light of the multiple wavelengths in the first wavelength range $\Lambda_1$ and second wavelength range $\Lambda_2$ that has arrived through the optical fiber transmission path 530, and outputs the signal light of the multiple wavelengths in the first wavelength range $\Lambda_1$ to the optical receiver 521 and the signal light of the multiple wavelengths in the second wavelength range $\Lambda_2$ to the optical receiver 522. One optical receiver 521 receives the signal light of the multiple wavelengths in the first wavelength range $\Lambda_1$, and demultiplexes it to receive signal light beams of the respective wavelengths. The other optical receiver 522 receives the signal light of the multiple wavelengths in the second wavelength range $\Lambda_2$, and demultiplexes it to receive signal light beams of the respective wavelengths.

In the optical communication system 1, the demultiplexing interleaver 523 has the same arrangement as that of the above interleaver, and exhibits an excellent demultiplexing characteristic. Since signal light of multiple wavelengths is demultiplexed by the interleaver having an excellent demultiplexing characteristic, the transmission quality of signal light in the optical communication system 1 becomes excellent.

The present invention is not limited to the above embodiments. For example, the interleavers 300 and 301 according to the third and fourth embodiments use optical circulators. However, the necessity of the optical circulators 2 and 100 may be eliminated by adjusting the angles of the respective reflecting mirrors 222, 223, 232, 233, 24, and 34 and the respective etalon filters 123 and 133.

INDUSTRIAL APPLICABILITY

As has been described in detail above, according to the present invention, the second optical system outputs light arriving thereat after giving the light an intensity change with wavelength dependence and a phase change. According to the present invention, this makes it possible to provide an optical filter, interleaver, and optical communication system which are excellent in isolation.

What is claimed is:

1. An optical filter comprising:
a first optical system which has a first beam splitter, splits light arriving at the first beam splitter through a first optical path into two light beams, and outputs the split light beams to different second and third optical paths, respectively;
a second optical system which outputs light arriving after being output from the first beam splitter to the second optical path upon giving the light an intensity change with wavelength dependence and a phase change; and
a third optical system which outputs, to the first beam splitter, light arriving after being output from the first beam splitter to the third optical path, wherein
the third optical system outputs light given an intensity change with wavelength dependence and a phase change to the first beam splitter,
said second optical system outputs light given an intensity change with wavelength dependence and a phase change to the first beam splitter,
said third optical system outputs light given an intensity change with wavelength dependence and a phase change to the first beam splitter, and
the first beam splitter splits the light arriving after being output from said second optical system into two light beams, outputs the light beams to the first optical path and a fourth optical path, respectively, splits the light arriving after being output from said third optical system into two light beams, and outputs the light beams to the first and fourth optical paths, respectively.

2. An optical filter according to claim 1, characterized in that
said second optical system comprises a second beam splitter different from the first beam splitter and first and second reflecting mirrors, splits light arriving at the second beam splitter through the second optical path into two light beams, outputs the light beams to the first and second reflecting mirrors, respectively, splits the light reflected by the first reflecting mirror and arriving at the second beam splitter into two light beams, outputs one light beam to the first beam splitter, splits the light reflected by the second reflecting mirror and arriving at the second beam splitter into two light beams, and outputs one light beam to the first beam splitter, and said third optical system comprises a third beam splitter different from the first beam splitter and third and fourth reflecting mirrors, splits light arriving at the third beam splitter through the third optical path into two light beams, outputs the light beams to the third and fourth reflecting mirrors, respectively, splits the light reflected by the third reflecting mirror and arriving at the third beam splitter into two light beams, outputs one light beam to the first beam splitter, splits the light reflected by the fourth reflecting mirror and arriving at the third beam splitter into two Light beams, and outputs one light beam to the first beam splitter.

3. An optical filter according to claim 2, characterized in that letting d2 be a length of the second optical path between the first beam splitter and the second beam splitter, d3 be a length of the optical path between the first beam splitter and the third beam splitter, d5 be a length of the fifth optical path between the second beam splitter and the first reflecting mirror, d6 be a length of the sixth optical path between the second beam splitter and the second reflecting mirror, d7 be a length of the seventh optical path between the third beam splitter and the third reflecting mirror, and d8 be a length of the eighth optical path between the third beam splitter and the fourth reflecting mirror, a free spectral range determined on the basis of a difference between the optical path lengths d5 and d6 and a free spectral range determined on the basis of a difference between the optical path lengths d7 and d8 each are set to ½ a free spectral range determined on the basis of a difference between the optical path lengths d2 and d3.

4. An optical filter according to claim 2, characterized in that a split ratio of the first beam splitter is 48% to 52%, and a split ratio of each of the second and third beam splitters is 24.9% to 28.9%.

5. An optical filter according to claim 1, characterized in that said second optical system comprises a second beam splitter different from the first beam splitter and a first reflecting mirror and a first etalon filter, splits light arriving at the second beam splitter through the second optical path into two light beams, outputs the light beams to the first reflecting mirror and the first etalon filter, respectively, splits the light reflected by the first reflecting mirror and arriving at the second beam splitter into two light beams, outputs one light beam to the first beam splitter, splits the light reflected by the first etalon filter and arriving at the second beam splitter into two light beams, and outputs one light beam to the first beam splitter, and said third optical system comprises a third beam splitter different from the first beam splitter, a second reflecting mirror, and a second etalon filter, splits light arriving at the third beam splitter through the third optical path into two light beams, outputs the light beams to the second reflecting mirror and the second etalon filter, respectively, splits the light reflected by the second reflecting mirror and arriving at the third beam splitter into two light beams, outputs one light beam to the first beam splitter, splits the light reflected by the second etalon filter and arriving at the third beam splitter into two light beams, and outputs one light beam to the first beam splitter.

6. An optical filter according to claim 5, characterized in that letting d2 be a length of the second optical path between the first beam splitter and the second beam splitter, and d3 be a length of the third optical path between the first beam splitter and the third beam splitter, a free spectral range of each of the first and second etalon filters is set to ½ a free spectral range determined on the basis of a difference between the optical path lengths d2 and d3.

7. An optical filter comprising:

a first optical system which has a first beam splitter, splits light arriving at the first beam splitter through a first optical path into two light beams, and outputs the split light beams to different second and third optical paths, respectively;

a second optical system which outputs light arriving after being output from the first beam splitter to the second optical path upon giving the light an intensity change with wavelength dependence and a phase change; and a third optical system which outputs, to the first beam splitter, light arriving after being output from the first beam splitter to the third optical path, wherein the third optical system outputs light given an intensity change with wavelength dependence and a phase change to the first beam splitter, said first optical system comprises a first reflecting mirror and a first etalon filter, splits light arriving at the first beam splitter through the first optical path into two light beams, outputs the light beams to the first reflecting mirror and the first etalon filter, respectively, splits light reflected by the first reflecting mirror and arriving at the first beam splitter into two light beams, outputs the light beams to the second and third optical paths, splits light reflected by the first etalon filter and arriving at the first beam splitter into two light beams, and outputs the light beams to the second and third optical paths, respectively, said second optical system comprises a second optical beam splitter different from the first beam splitter, a second reflecting mirror, and a second etalon filter, splits light arriving at the second optical beam splitter through the second optical path into two light beams, outputs the light beams to the second reflecting mirror and the second etalon filter, splits light reflected by the second reflecting mirror and arriving at the second optical beam splitter into two light beams, outputs one light beam to a second port, splits light reflected by the second etalon filter and arriving at the second optical beam splitter into two light beams, and outputs one light beam to the second port, and said third optical system comprises a third optical beam splitter different from the first beam splitter, a third reflecting mirror, and a third etalon filter, splits light arriving at the third optical beam splitter through the third optical path into two light beams, outputs the light beams to the third reflecting mirror and the third etalon filter, respectively, splits light reflected by the third reflecting mirror and arriving at the third optical beam splitter into two light beams, outputs one light beam to a third port, splits light reflected by the third etalon filter and arriving at the third optical beam splitter into two light beams, and outputs one light beam to the third port.

8. An optical filter according to claim 7, characterized in that letting d2 be an optical path length between the first beam splitter and the first reflecting mirror, and d3 be an optical path length between the first beam splitter and the first etalon filter, a free spectral range of each of the second and third etalon filters is set to ½ a free spectral range determined on the basis of a difference between the optical path length d2 and the optical path length d3.

9. An optical filter comprising:
a first optical system which has a first beam splitter, splits light arriving at the first beam splitter through a first optical path into two light beams, and outputs the split light beams to different second and third optical paths, respectively;
a second optical system which outputs light arriving after being output from the first beam splitter to the second optical path upon giving the light an intensity change with wavelength dependence and a phase change; and
a third optical system which outputs, to the first beam splitter, light arriving after being output from the first beam splitter to the third optical path, wherein
the third optical system has a reflecting mirror,
said second optical system outputs light given an intensity change with wavelength dependence and a phase change to the first beam splitter, and
the first beam splitter splits light arriving after being output from said second optical system into two light beams, outputs the light beams to the first optical path and a fourth optical path, respectively, also splits light arriving after being output from said reflecting mirror into two light beams, and outputs the light beams to the first and fourth optical paths, respectively.

10. An optical filter according to claim 9, characterized in that said second optical system comprises a second beam splitter different from the first beam splitter and first and second reflecting mirrors, splits light arriving through the second optical path into two light beams using the second beam splitter, outputs the light beams to the first and second reflecting mirrors, respectively, splits the light reflected by the first reflecting mirror and arriving at the second beam splitter into two light beams, outputs one light beam to the first beam splitter, splits the light reflected by the second reflecting mirror and arriving at the second beam splitter into two light beams, and outputs one light beam to the first beam splitter.

11. An optical filter according to claim 10, characterized in that letting d2 be a length of the second optical path between the first beam splitter and the second beam splitter, d3 be a length of the optical path between the first beam splitter and said reflecting mirror, d5 be a length of the fifth optical path between the second beam splitter and the first reflecting mirror, and d6 be a length of the sixth optical path between the second beam splitter and the second reflecting mirror, a free spectral range determined on the basis of a difference between the optical path lengths d5 and d6 is set to ½ a free spectral range determined on the basis of a difference between the optical path lengths d2 and d3.

12. An optical filter according to claim 10, characterized in that a split ratio of each of the first and second beam splitters is 48% to 52%.

13. An optical filter according to claim 9, characterized in that an isolation is not less than 15 dB.

14. An optical filter according to claim 9, characterized in that a wavelength dispersion is −5 ps/nm to 5 ps/nm.

15. An interleaver comprising:
an optical circulator having a first terminal, a second terminal, and a third terminal, wherein light input to the first terminal is output from the second terminal, and light input to the second terminal is output from the third terminal; and
an optical filter defined in claim 9, in which the first optical path is connected to the second terminal of said optical circulator.

16. An optical communication system which transmits signal light of multiple wavelengths, characterized by including an interleaver defined in claim 15, said interleaver demultiplexing the signal light of the multiple wavelengths.

17. An optical communication system which transmits signal light of multiple wavelengths, characterized by including an optical filter defined in claim 9, said optical filter selecting and transmitting signal light of the signal light of the multiple wavelengths.

* * * * *